(12) United States Patent
Shafir

(10) Patent No.: US 10,682,703 B2
(45) Date of Patent: Jun. 16, 2020

(54) SYSTEMS AND METHODS FOR DELIVERING MATERIALS FOR PRINTING THREE DIMENSIONAL (3D) OBJECTS

(71) Applicant: Aaron Roni Shafir, Tel Aviv (IL)

(72) Inventor: Aaron Roni Shafir, Tel Aviv (IL)

(*) Notice: Subject to any disclaimer, the term of this patent is extended or adjusted under 35 U.S.C. 154(b) by 28 days.

(21) Appl. No.: 15/869,395

(22) Filed: Jan. 12, 2018

(65) Prior Publication Data
US 2019/0134706 A1    May 9, 2019

Related U.S. Application Data

(60) Provisional application No. 62/582,327, filed on Nov. 7, 2017.

(51) Int. Cl.
*B29C 67/00* (2017.01)
*B22F 3/105* (2006.01)
(Continued)

(52) U.S. Cl.
CPC ............ *B22F 3/1055* (2013.01); *B22F 3/003* (2013.01); *B22F 3/008* (2013.01); *B33Y 10/00* (2014.12);
(Continued)

(58) Field of Classification Search
CPC .................................................. B22F 3/1055
See application file for complete search history.

(56) References Cited

U.S. PATENT DOCUMENTS 4,627,717 A    12/1986  Thompson et al.
6,033,820 A     3/2000  Hayashi et al.
(Continued)

FOREIGN PATENT DOCUMENTS

WO    WO-2008096105 A1 *  8/2008    ......... G03G 15/1625

OTHER PUBLICATIONS

Written Opinion of International Appln. No. PCT/IL2018/051170 dated Feb. 15, 2019.
(Continued)

*Primary Examiner* — Christopher S Kessler
(74) *Attorney, Agent, or Firm* — Browdy and Neimark, PLLC

(57) ABSTRACT

A delivery system for delivering a plurality of layers of a powder to a three dimensional (3D) printing system for printing at least one 3D object, the delivery system comprising: a rotatable drum having a rounded photosensitive outer surface, a hopper unit comprising a container for storing the powder, wherein the hopper unit is configured to dispense the powder on the photosensitive outer surface of the rotatable drum. The delivery system further comprises a delivery unit comprising a movable delivery plate having a conductive outer surface, an engine for moving the delivery plate to a working chamber of the 3D printing system, one or more charging electrodes configured to charge the rotatable drum, a charging unit configured to charge the delivery plate. The movable delivery unit is further configured to: electrically and successively attract the dispensed plurality of layers from the rotatable drum outer surface to its conductive outer surface; and transfer the attracted plurality of layers to the working chamber by electrically rejecting the attracted plurality of layers into the working chamber.

22 Claims, 18 Drawing Sheets

(51) Int. Cl.
*B33Y 30/00* (2015.01)
*B33Y 10/00* (2015.01)
*B22F 3/00* (2006.01)

(52) U.S. Cl.
CPC ....... *B33Y 30/00* (2014.12); *B22F 2003/1059* (2013.01); *B22F 2998/10* (2013.01); *B22F 2999/00* (2013.01)

(56) References Cited

U.S. PATENT DOCUMENTS 8,488,994 B2    7/2013   Hanson
2017/0274602 A1*   9/2017   Kobayashi ............ B29C 64/307

OTHER PUBLICATIONS

Search Report of International Appln. No. PCT/IL2018/051170 dated Feb. 15, 2019.

* cited by examiner

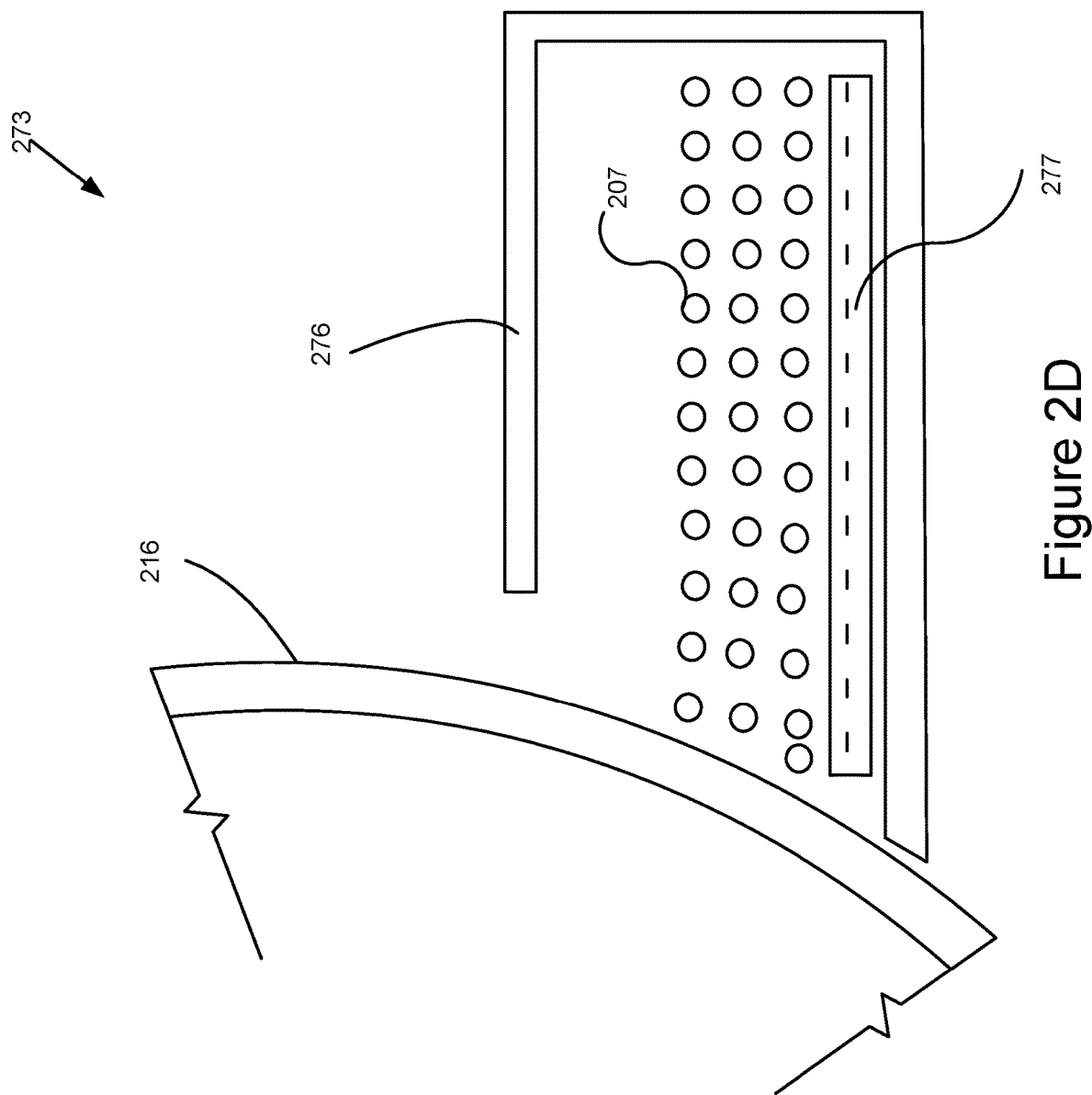

SYSTEMS AND METHODS FOR DELIVERING MATERIALS FOR PRINTING THREE DIMENSIONAL (3D) OBJECTS

CROSS-REFERENCE

The present application claims the benefit of U.S. Provisional Application Ser. No. 62/582,327, filed on Nov. 7, 2017, entitled "THREE DIMENSIONAL METAL PRINTING SYSTEMS AND METHODS USING PHASE ARRAY COHERENT HIGH-POWER LASER" which is incorporated herein by reference in its entirety.

FIELD OF THE INVENTION

The present invention relates generally to three-dimensional printing systems and methods and particularly to systems and methods for transferring materials to a 3D printing system.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

Three-dimensional (3D) printing, also known as additive manufacturing (AM), is growing in popularity. As technology progresses, different methods of forming 3D models through additive manufacturing technology have been proposed. Generally, additive manufacturing technology uses a design information of 3D models from software such as computer-aided design (CAD) to be converted to multiple thin cross sections (quasi-two-dimensional) continuously stacked. One of the common methods for 3D printing is to use powders and solidify them to the desired shape. Examples of prior 3D printing methods and systems include for example selective laser melting (SLM) or DMLS (Direct Metal Laser Sintering) comprising high power-density laser for melting and fusing metallic or polymers powders together.

In recent years, electrophotography methods and systems used in two-dimensional (2D) printing were implemented in 3D printing methods. In accordance with the prior art (2D) printing electrophotography systems include a conductive support drum coated with a photoconductive material, where latent electrostatic images are formed by uniformly charging and then image-wise exposing the photoconductive layer by an optical source. The latent electrostatic images are then moved to a developing station where toner is applied to uncharged areas of the photoconductive insulator to form visible images. The formed toner images are then transferred to substrates (e.g., printing paper) and affixed to the substrates with heat or pressure.

An example of additive manufacturing system for printing a three-dimensional part using electrophotography is illustrated in U.S. Pat. No. 8,488,994 entitled "Electrophotography-based additive manufacturing system with transfer-medium service loops". The additive manufacturing system including a rotatable photoconductor component, a development station configured to develop layers of a material on a surface of the rotatable photoconductor component, a rotatable transfer medium configured to receive the developed layers from the surface of the rotatable photoconductor component, and a platen configured to receive the developed layers from the rotatable transfer medium in a layer-by-layer manner. The additive manufacturing system also includes a plurality of service loops configured to move portions of the rotatable transfer medium at different line speeds while maintaining a net rotational rate of full rotations of the rotatable transfer medium at a substantially steady state.

FIG. 1 illustrates a Selective laser melting (SLM) system 100 for dispensing materials in the form of powder in a 3D printing system, in accordance with the prior art. The system 100 comprises a fusing container 101 a powder container 102 and a laser head 103 configured to emit a laser beam for fusing a powder layer image dispensed from the powder container 102 to the fusing container 101. Specifically, in operation once a fusing process of a single layer (e.g. the top layer) is completed a carrier plate 106 (holding the powder 104 and the printed model 105) moves down while the carrier plate 108 moves up and a roller 109 or plate dispenses a layer of powder from powder container 102 to container 101 to be fused by the laser head 103.

SUMMARY OF THE INVENTION

In accordance with a first embodiment of the present invention there is provided a delivery system for delivering a plurality of layers of a powder to a three dimensional (3D) printing system for printing at least one 3D object, the delivery system comprising: a rotatable drum having a rounded photosensitive outer surface; a hopper unit comprising a container for storing the powder, wherein the hopper unit is configured to dispense the powder on the photosensitive outer surface of the rotatable drum; a delivery unit comprising a movable delivery plate having a conductive outer surface, said delivery unit is connectable to an engine for moving the delivery plate to a working chamber of the 3D printing system; one or more charging electrodes configured to charge the rotatable drum; a charging unit configured to charge the delivery plate; and wherein the movable delivery unit is further configured to: electrically and successively attract the plurality of layers from the rotatable drum outer surface to its conductive outer surface; and transfer the attracted plurality of layers to the working chamber by electrically rejecting the attracted plurality of layers into the working chamber.

In some embodiments, the conductive outer surface of the delivery plate is coated with one or more layers of insulating materials.

In many embodiments, the powder comprises non-conductive or conductive powder materials.

In many embodiments, the hopper unit comprises one or more layers of insulating material.

In many embodiments, the rotatable drum comprises a cleaning unit configured to clean the photosensitive outer surface of said rotatable drum.

In many embodiments, the delivery unit comprises a cleaning unit configured to clean the surface of said delivery plate.

In many embodiments, the delivery system comprises a plurality of rotatable drums having a rounded photosensitive outer surface for receiving respectively said plurality of layers, wherein each of the plurality of rotatable drums comprises: the hopper unit, wherein each hopper unit comprises said container for storing the powder or other one or more types of powder; a cleaning unit configured to clean the respectively the photosensitive outer surface; one or more charging electrodes configured to apply electrostatic charge to each respective rotatable drum of said plurality of rotatable drums; an energy scanning unit, wherein each energy unit comprises an energy source configured to selectively emit a light beam towards the respective photosensitive outer surface for discharging the photosensitive outer surface in accordance with a predefined image structure of the at least one 3D object; and wherein the movable delivery plate is configured to successively and electrically attract said plurality of layers from said plurality of rotatable drums forming at said plate outer surface a layer of powder and transfer said layer of powder in a layer by layer manner to the working chamber by electrically rejecting the said layer of powder into the working chamber.

In many embodiments, the working chamber comprises: a working surface configured to receive said plurality of layers and be lowered step by step; and an energy head for fusing said plurality of layers.

In many embodiments, the energy head is a laser head configured to apply a focused laser beam to a given area of each of layer of said plurality of layers corresponding to a selected cross-sectional area of a model of the molded 3D object, in accordance with the CAD cross-sectional data of the selected cross-sectional area of the model in such a way that each layer of powder is fixed to the layer below.

In many embodiments, the 3D printing system is a compressing system.

In many embodiments, the compressing system comprises: a container having a cavity; a receiving surface for receiving the plurality of layers from the delivery plate; and a top press for pressing the received plurality of layers and forming dense powder layers.

In many embodiments, the dense powder layers are sintered.

In many embodiments, one of said dense powder layers comprise a material which may not be sintered.

In accordance with a second aspect of the present invention there is provided a method for delivering a plurality of layers of a powder to a 3D printing system for generating one or more 3D objects, the method comprising: rotating at least one drum having a photosensitive surface; charging the at least one rotating drum for receiving said plurality of layers from a hopper unit at said photosensitive surface; moving a delivery unit tangentially in respect to said at least one drum to a working chamber, wherein said delivery unit comprises a movable delivery plate having a flat conductive outer surface; charging said delivery plate for attracting successively said plurality of layers from the photosensitive surface of said at least one drum; switching the electrical polarity of said delivery plate once said delivery plate is located above or in proximity to said working chamber for rejecting said plurality of layers into the working chamber.

In many embodiments the method includes fusing the rejected plurality of layers by an energy unit for creating said one or more 3D objects.

In many embodiments the method comprises compressing each of said rejected plurality of layers.

In many embodiments the method comprises sintering the compressed plurality of layers.

In many embodiments the plurality of layers comprise a first type of powder material and a second type of powder material wherein the second powder material has a higher sintering temperature than the first powder material.

In many embodiments the method comprises moving said delivery unit at a rate that is synchronized with the rotatable drum speed.

In accordance with a third embodiment of the present invention there is provided a delivery system for delivering a plurality of layers of a powder for printing at least one 3D object, the delivery system comprising: a plurality of rotatable drums, wherein each of said plurality of rotatable drums having a photosensitive outer surface for receiving respectively said plurality of layers, and wherein each of said plurality of rotatable drums comprises: a hopper unit, wherein said hopper unit comprises a container for storing the powder; a cleaning unit configured to clean the respective photosensitive outer surface of said plurality of rotatable drums; one or more charging electrodes configured to respectively apply electrostatic charge to the rotatable drum; a scanning energy unit, wherein the scanning energy unit comprises an energy source configured to selectively emit a light beam towards the respective photosensitive outer surface of the plurality of rotatable drums for discharging the photosensitive outer surface in accordance with a predefined image structure of the at least one 3D object; and a delivery unit comprising a movable delivery plate having a conductive outer surface, said delivery unit is connectable to an engine for moving the delivery plate to a working chamber of the 3D printing system; a charging unit configured to charge the delivery plate; and wherein the movable delivery plate is configured to successively and electrically attract the plurality of layers from said plurality of rotatable drums forming at said plate outer surface a layer of powder and transfer the layer of powder in a layer by layer manner to the working chamber by electrically rejecting the layer of powder into the working chamber.

BRIEF DESCRIPTION OF THE DRAWINGS

A better understanding of the features and advantages of the present disclosure will be obtained by reference to the following detailed description that sets forth illustrative embodiments, in which the principles of embodiments of the present disclosure are utilized, and the accompanying drawings.

FIG. 2D is a schematic diagram illustrating a hopper unit configured to feed materials to a rotating drum, in accordance with embodiments;

DETAILED DESCRIPTION OF THE INVENTION

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the Figure and described in the specification, but only as indicated in the accompanying claims, with the proper scope determined only by the broadest interpretation of said claims.

As used herein like characters refer to like elements.

As such, as used herein, the term "photoconductive" may also relate to photosensitive.

The configurations disclosed herein can be combined in one or more of many ways to provide improved 3D printing delivery methods, systems and apparatus. One or more components of the configurations disclosed herein can be combined with each other in many ways.

According some embodiments there are provided methods and systems for printing a 3D model comprising transferring a single type of powder to a working chamber of a 3D printing system using electrostatic methods.

In accordance with other embodiments, there are provided methods and systems for transferring a plurality of layers in the form of powder, wherein the plurality of layers may comprise two or more materials (e.g. different materials of powder) for printing at least one 3D object. The delivery system comprising: a rotatable drum having for example a rounded photosensitive outer surface; a hopper unit comprising a container for storing the one or more materials, wherein the hopper unit is configured to dispense the powder on the photosensitive outer surface of the rotatable drum; a delivery unit comprising a movable delivery plate having for example a flat conductive outer surface, can be isolated, and wherein the delivery unit is connectable to an engine for moving the delivery plate to a working chamber; one or more charging electrodes configured to apply electrostatic charge to the rotatable drum and to the movable delivery unit; and wherein the movable delivery unit is further configured to: electrically and successively attract from the rotatable drum outer surface to its photosensitive outer surface the plurality of dispensed layers of material; and transfer in a layer by layer manner the attracted layers of material to a working chamber of a 3D printing system by electrically rejecting the layers of material into the working chamber.

In accordance with another embodiment there are provided methods and systems for printing a 3D model comprising delivering powder to a working chamber using vacuum suctions methods.

In some cases the powder is coated or included with a dielectric material or liquid. The dielectric material may include nanoparticles made of for example polyester or wax comprising in nanocomposite or coating.

Figure 1:
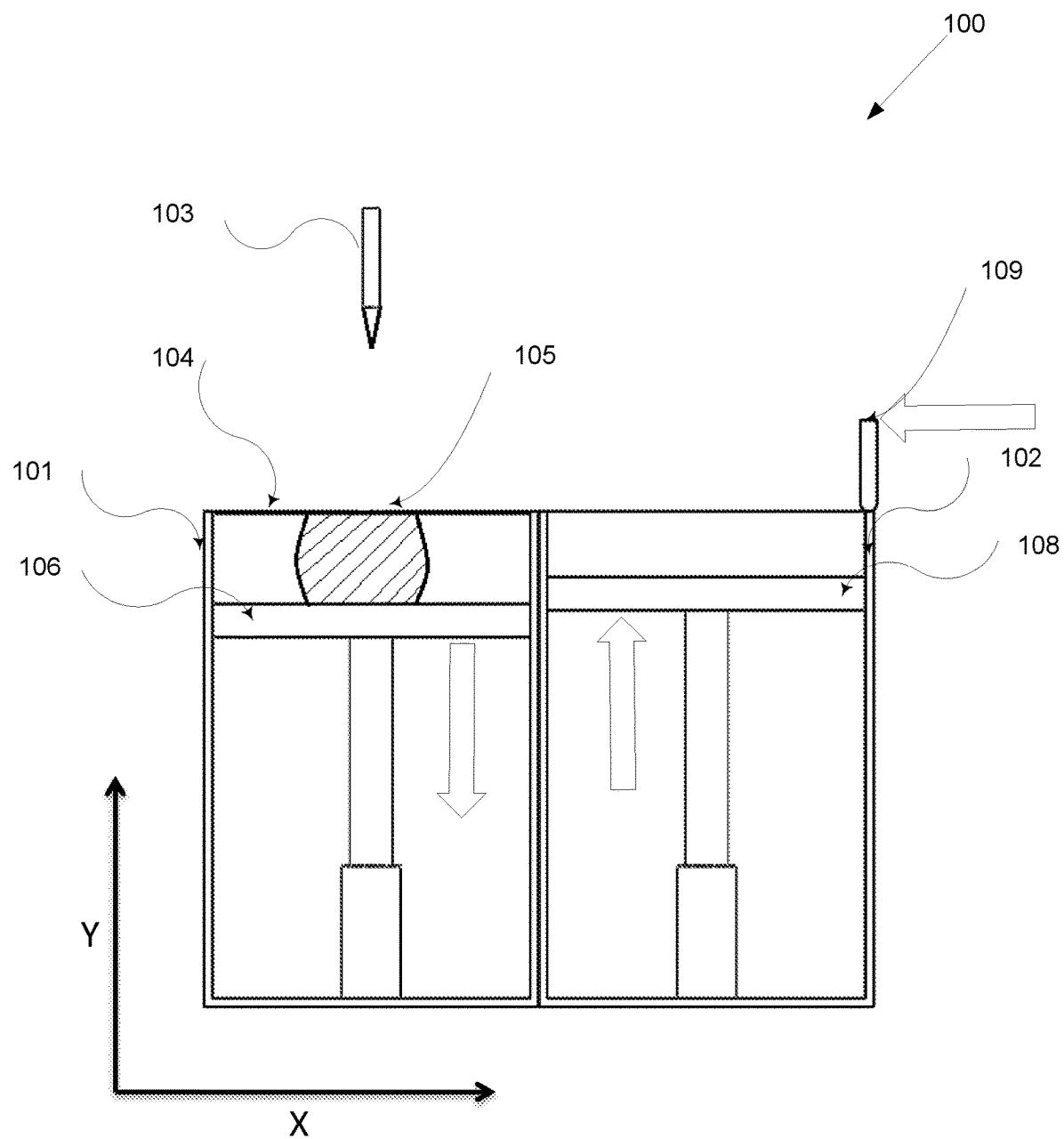
FIG. 1 illustrates a system for printing a 3D model using layers of powder, in accordance with the prior art.
Figure 2A:
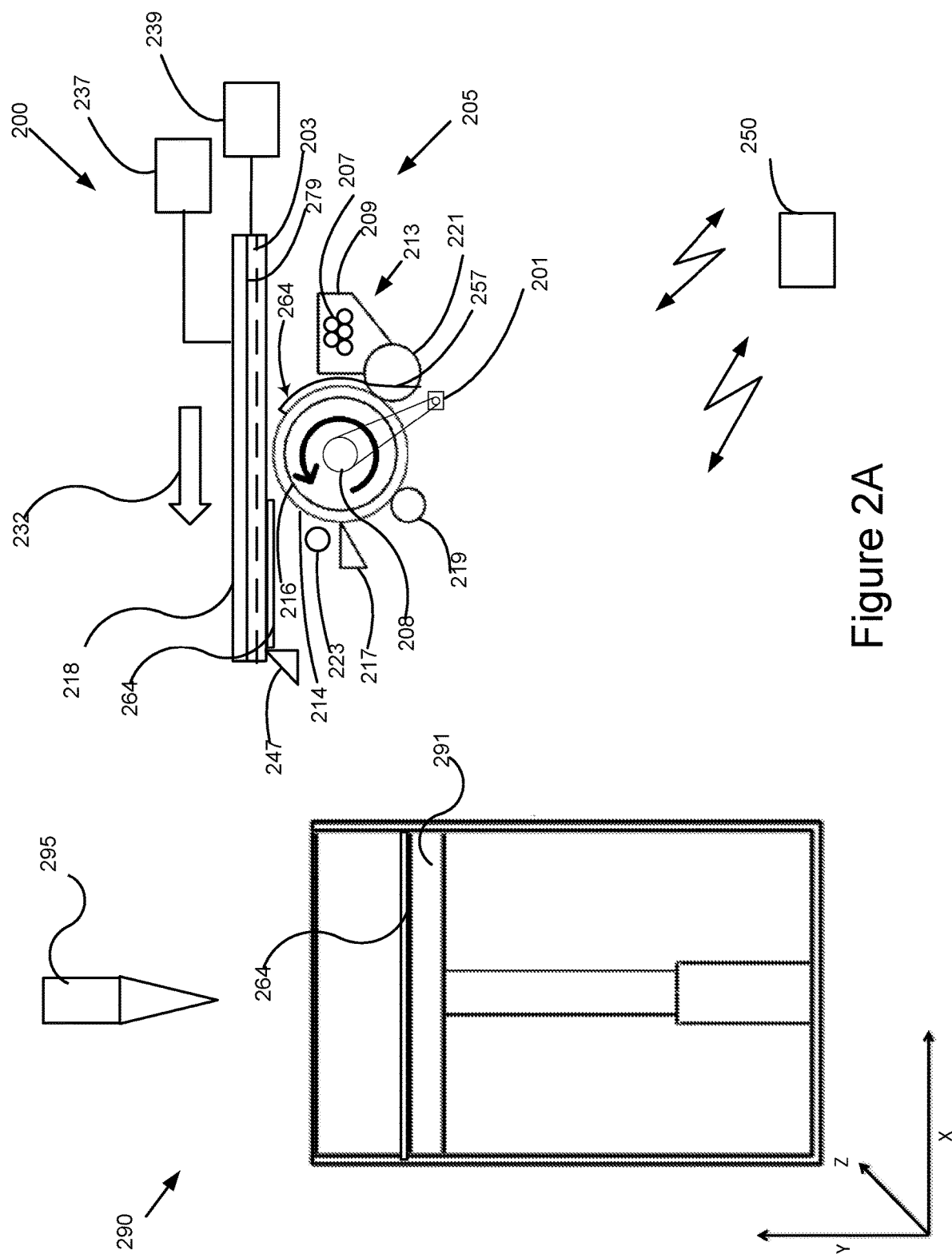
FIG. 2A is a schematic diagram illustrating a delivery system configured to deliver one or more materials to a working chamber of a three-dimensional printing unit using electrostatic methods, in accordance with embodiments.

FIG. 2A shows a delivery system 200 configured to deliver one or more materials to a working chamber 290 of a three-dimensional printing unit using electrostatic methods, in accordance with embodiments. The system 200 comprises a rotating photoconductive or photosensitive component such as a photoconductive or photosensitive drum 214 configured to rotate, for example anticlockwise, by one or more motors 201 in accordance with a predefined rotating speed and to receive the one or more layers of material (e.g. in the form of powder) by electrically attracting the materials from a hopper unit 213. The system 200 further comprises a delivery unit 205 which comprises a delivery plate 218 such as a movable delivery plate configured to move and attract the materials from the photoconductive drum 214. Additionally, the delivery plate 218 is configured to transport the attracted one or more layers of material to a working chamber 290 where the material is for example fused by an energy source such as a laser source 295. Alternatively, the delivered one or more layers of material may be pressed according to known 3D printing or compressing methods for forming a 3D model.

According to some embodiments, the drum 214 is configured to rotate for example around shaft 208. Shaft 208 is correspondingly connected to drive motor 201, which is configured to rotate shaft 208 anticlockwise. In some cases the drum 214 may be rotated in a constant rate.

The drum 214 may have a cylinder shape or other shapes and may include or may be made of conducting materials such as copper, aluminum, or the like. The drum 214 includes a surface, such as a rounded photosensitive or photoconductive outer surface 216 configured to be electrostatically uniformly charged by charging means, for example by charging unit 219.

In some cases, the surface 216 is a thin film extending around the circumferential surface of conductive drum 214, and is derived from one or more photoconductive materials, such as amorphous silicon, selenium, and the like. Surface 216 is configured to receive one or more materials using electrostatic attraction forces, for example in the form of powder dispensed from a hopper unit 213 positioned for example at the right side of the drum 214.

According to some embodiments, the hopper unit 213 comprises a container or cartridge 209 for storing the one or more materials, for example in the form of powder 207, and one or more channels for releasing the powder 207 attracted by the charged rotated surface 216. According to some embodiments, the hopper unit 213 comprises a drum 221 configured to receive the powder from the container 209 and to rotate while the powder 207 is electrically attached to uncharged areas on the drum 214.

In some cases the hopper unit 213 may comprise a developer blade 257 configured to charge the powder. Specifically the developer blade 257 may be attached on top of the hopper drum 221. The developer blade 257 may include for example a layer of stainless steel with chromium or like materials.

According to some embodiments, the powder 207 may be electrically charged during its friction with the developer blade 257 and as the powder 207 is dispensed from the container 209 and attached (e.g. attracted) to the drum, the powder is rubbed and electrostatically charged by the developer blade. Since the dispensed powder is charged with the same charge as the charged areas in the drum 216, the powder 207 is removed from the charged areas and attached to the drum only in areas exposed by an energy scanning unit 270.

In some embodiments, the powder may comprise or may be made of a conductive material coated with an insulating material.

The drum 214 may comprise on its radial surface a cleaning unit 217 which is in proximity with the rotated drum 214 for cleaning the surface 216 from particles left from previous dispensing cycles. In some cases, in proximity to the cleaning unit 217 the system 200 comprises a discharger unit 223 for discharging the drum for example by directing a light beam to the surface 216. According to some embodiments the charging unit 219 may include a roller charge (e.g. corona wire, scorotrons, charging rollers, and other electrostatic charging devices) configured to charge the rotated drum and/or the surface 216.

According to some embodiments, the delivery plate 218 is configured to move, for example along a track, in direction 232 towards the working chamber 290 using one or more engines. In some cases, the delivery plate 218 is connected to an actuator such as a linear actuator or a linear piston. In some cases, the delivery plate 218 may be connected to a rotary system such as a motor configured to translate the motor's axial motion into rotational motion by gear transmission or by screw assemblies.

According to some embodiments the delivery plate 218 is positioned and moved above the drum 214 in a direction of arrow 232 tangent to the drum 214 (e.g. in parallel to X axis of an X-Y-Z axis) and towards the working chamber 290. The rotation speed of the drum 216 and delivery plate 218 speed are synchronized for example by a processor 250 for receiving the dispensed material immediately once the delivery plate 218 is positioned above or below the drum 216 and for keeping a tidy and straight layer.

In some cases, the delivery plate 218 may have a rectangular shape or other shapes and may be made of conducting material such as copper, aluminum or the like. In accordance with embodiments, the delivery plate 218 is made of conducting material so it can be charged by electric charger 237 with an electric charge that will pull the powder layer 264 from the drum 214. In some cases, the delivery plate may include a conductive flat outer surface, made of conducting material such as copper, aluminum or the like. In some cases, the delivery plate may have a thickness of few centimeters, for example 1-5 microns.

According to some embodiments, the delivery plate 218 may comprise one or more layers of insulating material. Specifically, in the case a powdered material made of a conductive material is used for generating the 3D object, the bottom part of the delivery plate 218 (e.g. the delivery plate outer surface 203 which is in contact with the powder) may comprise a thin layer 279 of for example 1-20 micron of insulating material configured to prevent the electrical charge of the powder from passing the charge to the delivery plate.

According to some embodiments, the delivery plate 218 comprises a cleaning unit 247 located for example at one of the distal ends (e.g. left distal end) below the delivery plate 218 for cleaning the surface 213 from material particles left from previous delivery cycles.

According to some embodiments, the working chamber 290 comprises a carrier plate 291 (for receiving the powder layers) which is configured to elevate up or down and receive the layer of materials from the delivery plate.

According to some embodiments, the delivery system 200 is configured to dispense material in the form of powder from the hopper unit to the drum's surface without using scanning or energy means such as laser or imaging devices to selectively emit a light beam towards the respective photosensitive outer surface of the drum for discharging the photosensitive outer surface, therefore enhancing and accelerating the powder delivery process.

According to some embodiments, the energy source 295 may be a laser source such as a fiber phase array coherent high-power laser configured to atomize one or more heat fusible materials such as material layer 294 to create the layers of the 3D objects. Or using known Electron Beam Melting (EBM) method for fusing the image in the layers.

In operation, a plurality of powder layers (e.g. homogenous layers) are successively dispensed from the hopper unit 213 on the entire or substantially entire circumference surface 216 of the drum 214. At the following step the delivery plate 218 may be charged with electrical charge opposite to the powder's charge for example positively by an electric charger 237 for attracting the powder from the rotated surface 216. Following the charging phase the delivery plate 218 starts moving (e.g. horizontally, for example along X axis,) towards the working chamber 290. When the delivery plate is located above or partially above the drum (e.g. tangentially or in proximity to the rotating drum) the powder layers of the material are electrically attracted to the delivery plate surface 203. At the following step, the delivery plate 218 continues moving from the rotating drums to the working chamber 290 and once the delivery plate 218 is above the working chamber 290 the electric charger 237 switch the electrical polarity of the delivery plate. For example, the electric charger 237 discharges the plate's electrical charge and charges the plate with opposite electrical charge to the charge it had previously. Since the powder and the plate are now both loaded with the same polarity, the powder is electrically repelled from the plate and falls to the working chamber 290.

Accordingly, at each delivery cycle a powder layer is rejected from the delivery plate 218 and received at the working chamber 290. Thereafter, each received powder layer is, for example separately fused by the energy unit or compressed by pressing means according to a respective 3D cross section image of the 3D object image.

It is stressed that in accordance with some embodiments the 3D object final structure or cross sections are formed at the working chamber 290 and not at the delivery plate or drum.

Figure 2B:
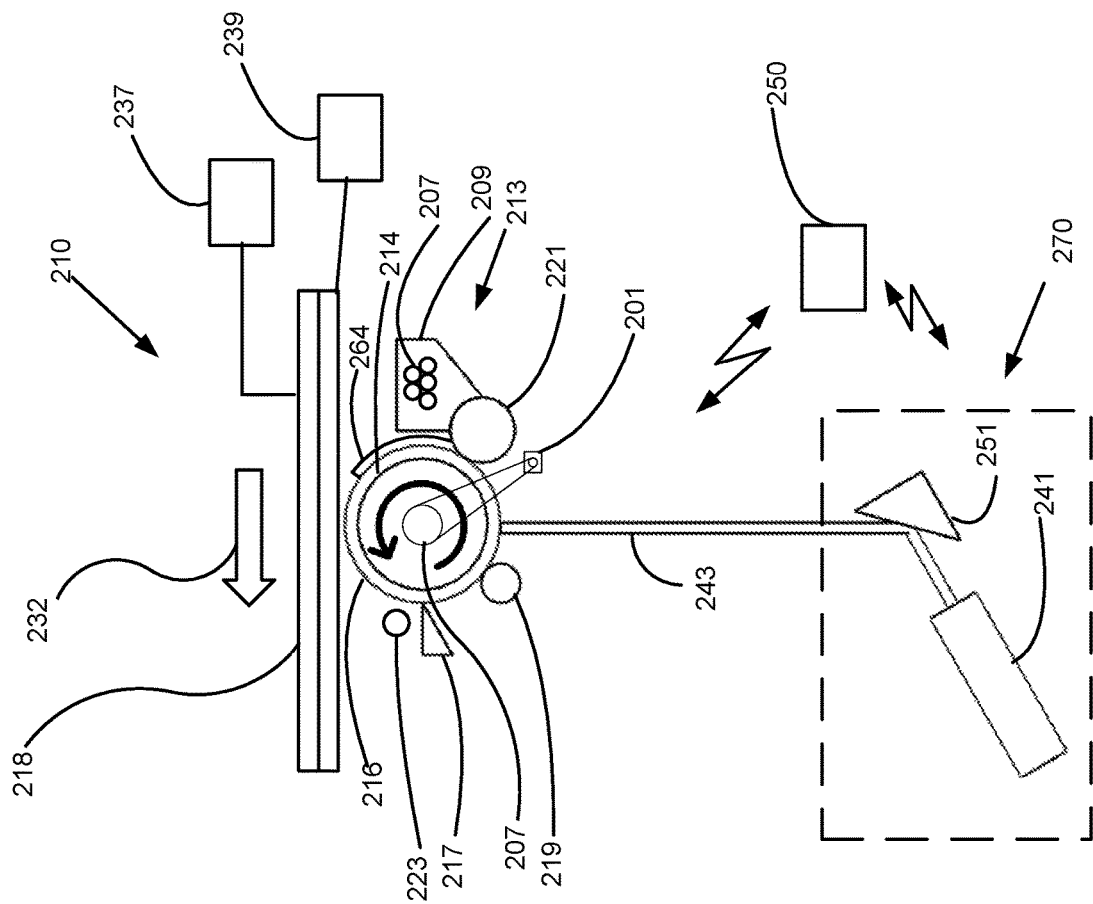
FIG. 2B is a schematic diagram illustrating a delivery system comprising a scanning unit, in accordance with embodiments.
Figure 2B:
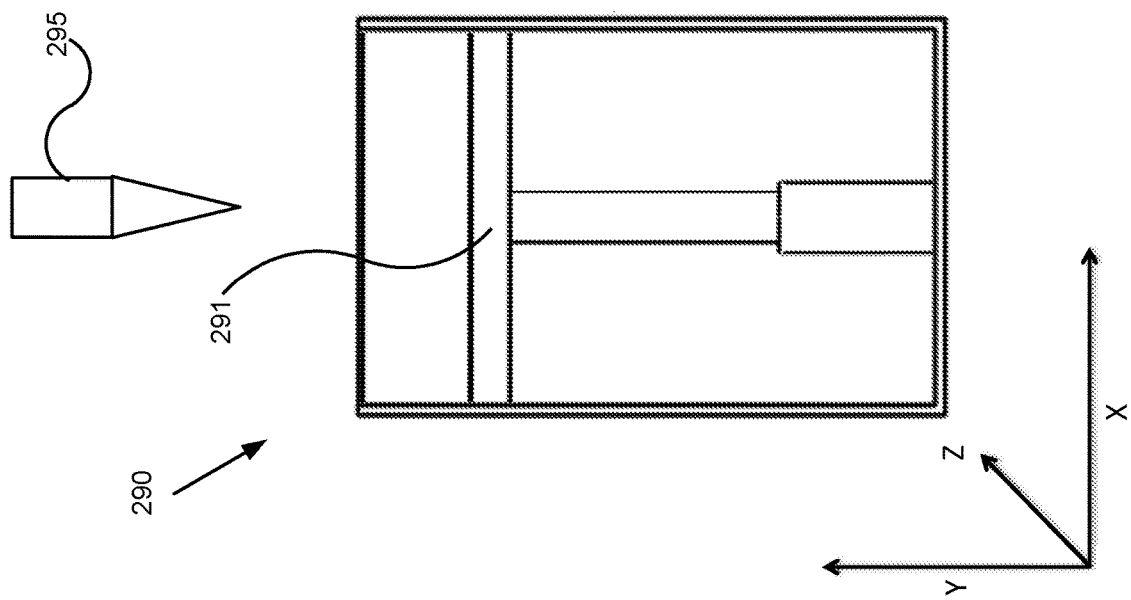

FIG. 2B is a schematic diagram illustrating a system 210 in accordance with another embodiment. System 210 present all elements of aforementioned system 200 but further includes an energy scanning unit 270 comprising for example an energy source 241, such as a laser source, which is in communication with a processor unit 250 for controlling the scanning unit 270 in accordance with a predefined image structure of the 3D object. The scanning unit 270 is configured to selectively emit a light beam 243 via a mirror unit 251, according to the processor unit 250, towards the electrostatic charged surface 216 as the drum 214 rotates (e.g. anticlockwise) for discharging the surface 216 in accordance with a predefined image structure. The selectively discharged locations cause powder to fall out of the container tube and electrically be attached to the surface 216 forming a layer of the model cross section according to the 3D CAD model. The dispensed powder 264 is rotated towards the charged delivery plate 218 which attracts the dispensed powder 216 and deliver it to the working chamber 290.

According to some embodiments, the energy source may be a scanning laser (e.g., gas or solid state lasers) light sources, light emitting diode (LED) array exposure devices, and other exposure device conventionally used in 2D electrophotography systems. In alternative embodiments, suitable devices for the energy source include ion-deposition systems configured to selectively directly deposit charged ions or electrons to the drum surface 216 to form the latent image charge pattern.

Figure 2C:
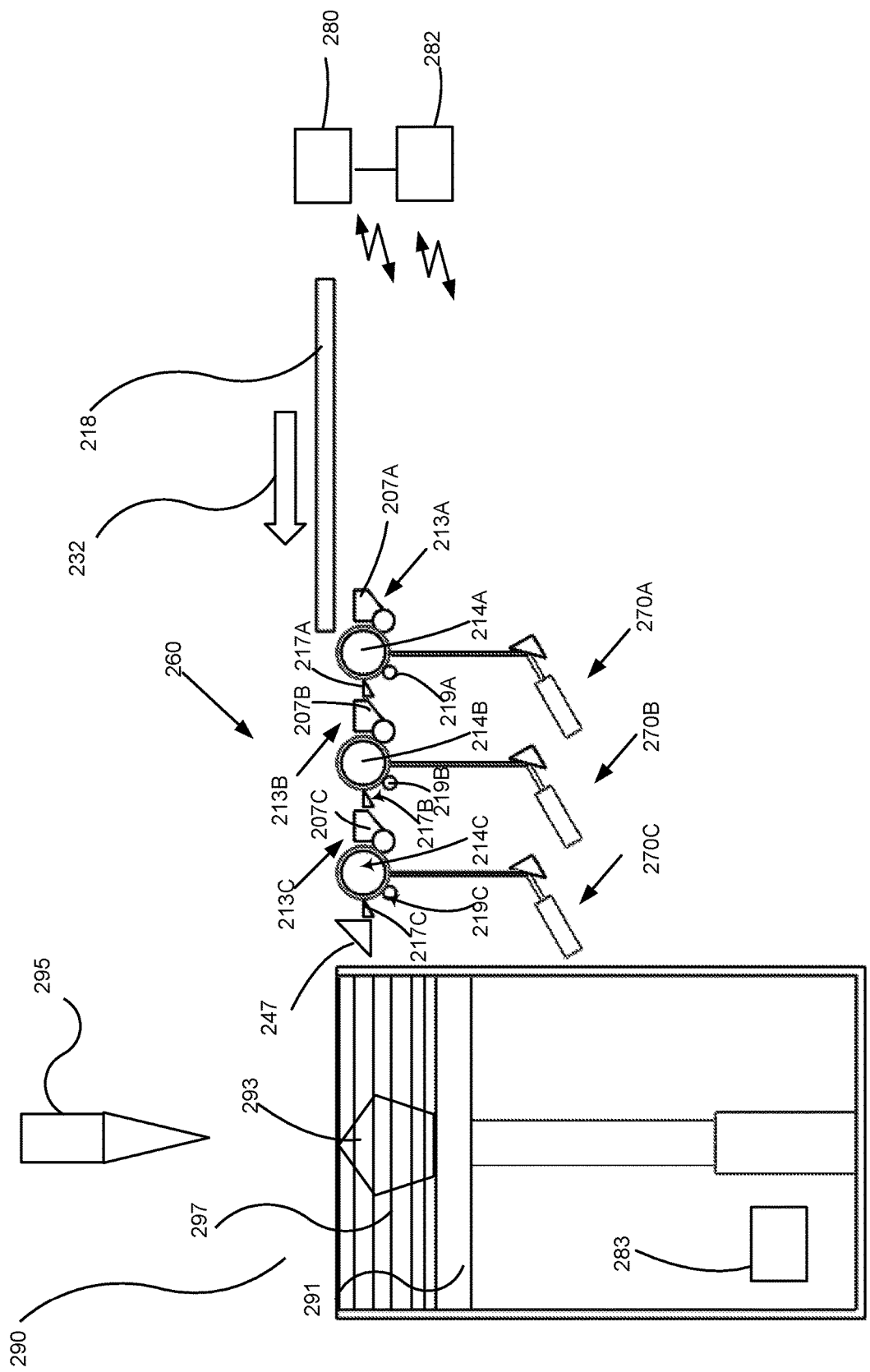
FIG. 2C is a schematic diagram illustrating a multiple material delivery system for printing a 3D object made of multiple types of materials, in accordance with embodiments.

FIG. 2C shows a multiple material delivery system 260 for printing a 3D object 293 made of multiple types of materials, in accordance with embodiments. The delivery system 260 is configured to deliver, for example simultaneously, multiple materials, such as different types of materials 207A, 207B, 207C in the form of powder, to working chamber 290. The multiple material delivery system 260 comprises at least two drums, for example three drums 214A, 214B and 214C. According to some embodiments each drum comprises the units as illustrated in FIG. 2B. Specifically, the three drums 214A, 214B and 214C comprise respectively three hopper units 213A, 213B and 213C comprising for example different powder materials 207A, 207B and 207C, three cleaning units, three discharger units 219A, 219B, 219C and three scanning units 270A, 270B and 270C. The delivery system 260 further comprises one or more controlling units 280 including one or more processors such as microprocessor-based engine control systems and/or digitally-controlled processor systems which are configured to operate the components of multiple delivery system 260 in a synchronized manner based on printing instructions received from host computer 282. Host computer 282 is one or more computer-based systems configured to communicate with controller 280 to provide the delivery instructions (and other operating information). In some cases the controller may be in communication with a printer controller 283 for scheduling and/or synchronizing the delivery of the powder to the working chamber. For example, host computer 282 may transfer information to processing controllers 280 and 283 that relates to the desired 3D model, accordingly controller 280 schedules controller 283 on each cycle of delivery layer, thereby allowing system 260 to deliver swiftly in a layer-by-layer manner to the working container 290.

In some cases materials 207A 207B and 207C may be selected from the group consisting of: titanium, aluminum, stainless steel or nickel based superalloys.

FIG. 2D is a schematic diagram illustrating a hopper unit 273 configured to feed materials 207, for example conductive materials in the form of powder particles, to a rotating drum 216, according to some embodiments. The hopper unit 273 comprises a container 276, shaped as a box or cube for storing the materials 207. The container 276 may be made of an insulating material such as ABS plastic, Ceramic or known insulating materials. In other embodiments the container may comprise or may be coated internally by one or more insulating materials, for example at one or more contact zones inside the container to prevent scattering of electrical charge of the charged materials.

In operation, the materials 207 may be charged with a high electrical potential, for example hundreds of thousands of volts (e.g. 5,000-200,000 volts), by one or more electrode units 277, located for example at the bottom of container 276. In some cases, all or substantially all the powder particles 207 are loaded with the same electrical charge and are therefore repelled from each other forming a cloud of particles of the powder particles 207. When the loaded powder reaches the drum 216 it is attached to the areas marked by the laser scanner in a similar way to the existing method.

According to some embodiments, the powder particles 207 may be coated with a thin dielectric material having for example a thickness range of 1 to 5 micron. Alternatively the powder particles 207 may include nanoparticles attached to the powder particles' external surface, when the nanoparticles has dielectric properties. In some cases the powder is charged. In some cases, the single particle of powder may have a size of 3 to 100 microns. The nanoparticles coating provides the powder with electrostatic attributes and may evaporate during a fusion process. The nano particles may be attached to the powder 207.

In some cases, the powder particles may be non-conductive materials.

Figure 3:
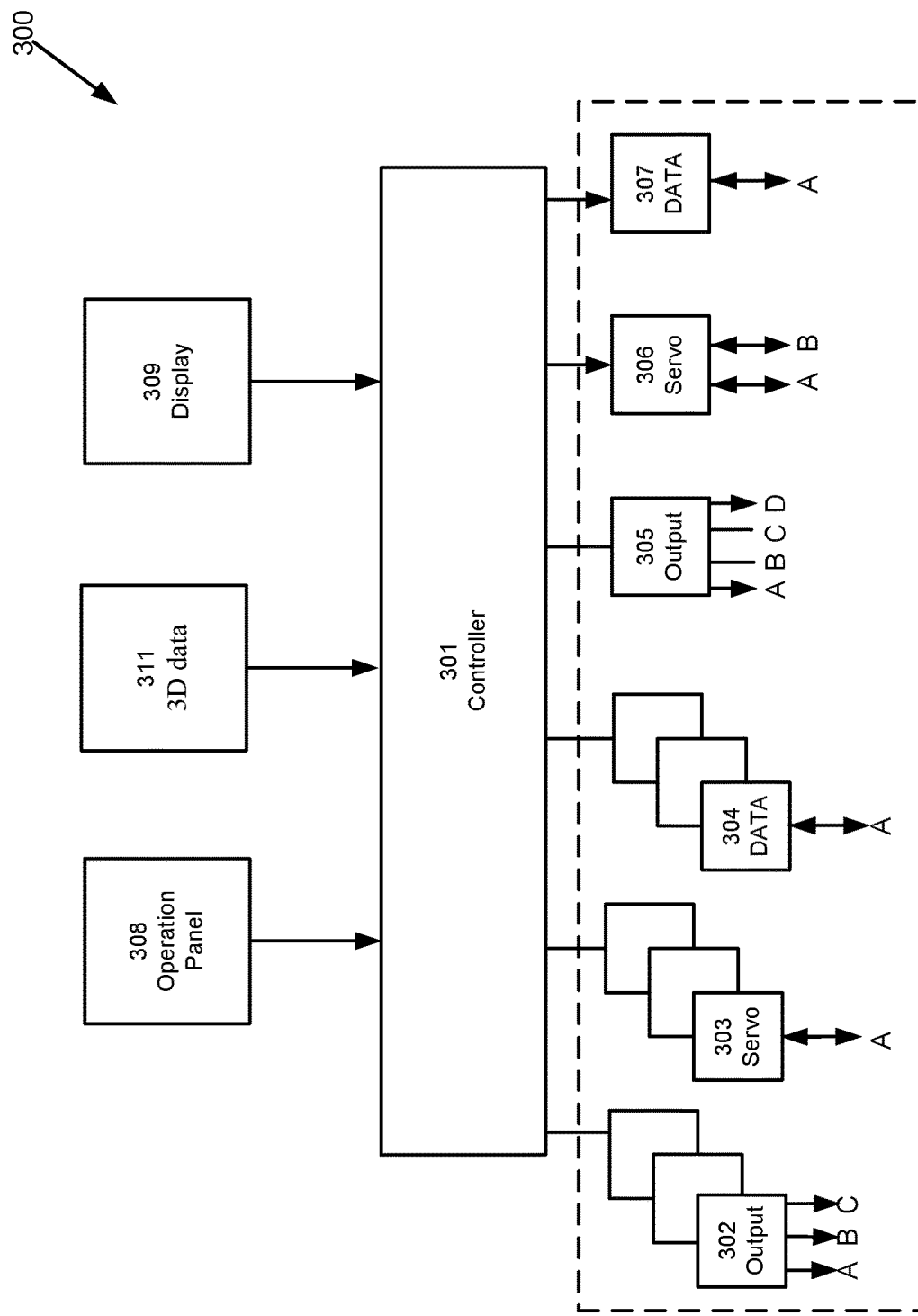
FIG. 3 is a high level block diagram schematically illustrating elements, including software elements such operating commands and hardware elements of a delivery system, in accordance with embodiments.

FIG. 3 is a high level block diagram schematically illustrating elements, including software elements such operating commands and hardware elements of a delivery system 300, in accordance with embodiments. The system 300 comprises a computing unit comprising one or more computer-based systems configured to communicate with controller 301 to provide the delivery and print instructions 317 (and other operating information).

The instructions 317 for implementing the delivery and printing processes of exemplary method 400 can be stored in a non-transitory computer-readable storage medium for example in the computing unit. When executed by the computing system, the instructions can cause the computing system to perform the method of running a delivery and printing system based on a predefined data. In some embodiments, the non-transitory computer-readable storage medium is one or more physical apparatuses used to store data or programs on a temporary or permanent basis. For instance, the non-transitory computer-readable storage medium comprises flash memory, dynamic random-access memory (DRAM), CD-ROMs, DVDs, flash memory devices, magnetic disk drives, magnetic tapes drives, optical disk drives, and cloud computing based storage.

Figure 13:
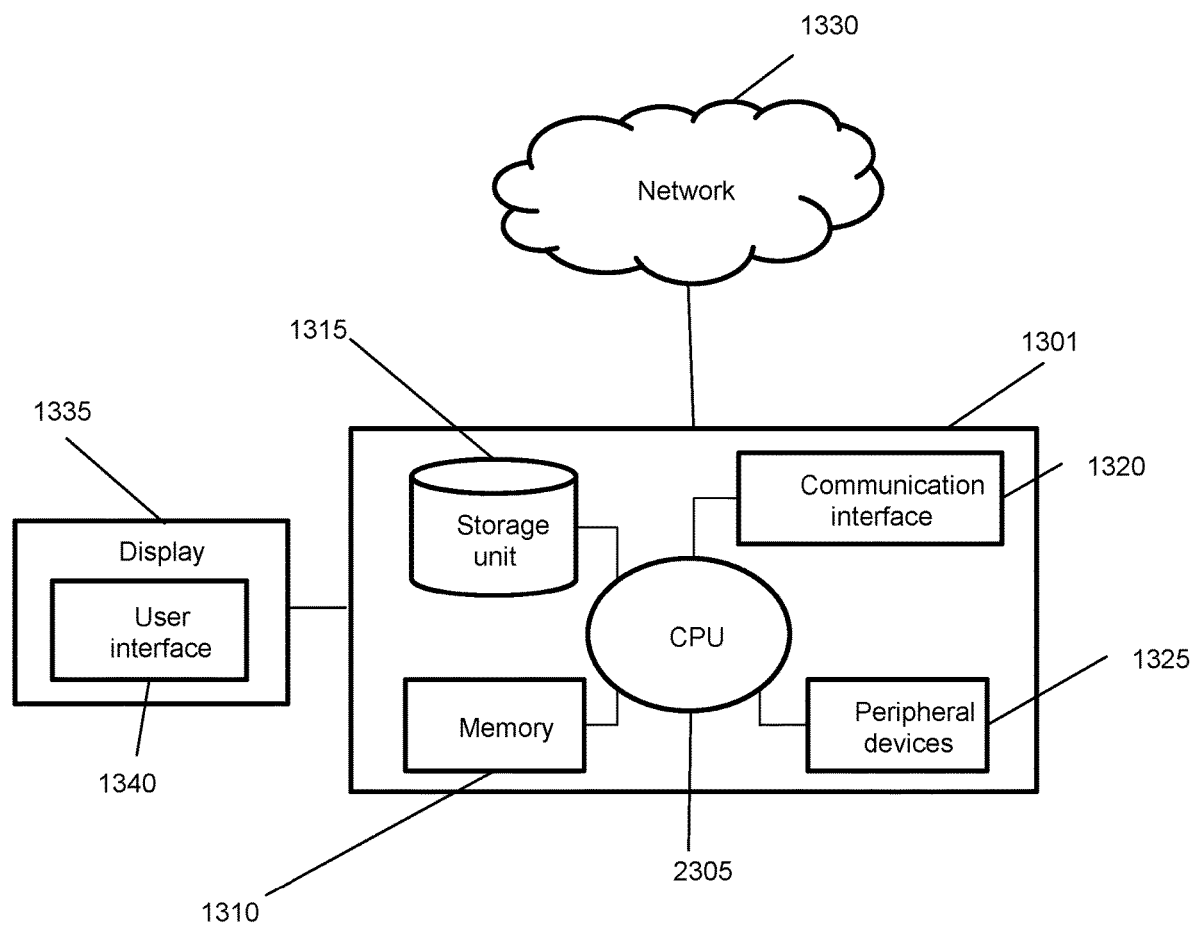
FIG. 13 shows a computer system suitable for incorporation with the methods and apparatus in accordance with some embodiments of the present disclosure.

A computing system suitable for incorporation with the methods and apparatus in accordance with some embodiments of the present disclosure is illustrated in FIG. 13.

The controller is configured to receive 3D data 311 including info such as three dimensional computerized model (e.g. STL [Standard Template Library] format files) converted for example to multiple thin cross sections (quasi-two-dimensional) where each cross section includes multiple layer images for each respective powder material. For example, for a 3D model comprising three types of powder materials, three cross section images will be provided for each layer. The controller analyzes the received info for providing commands 302-307 for operating the delivery system, preferably in the following order. However it is noted that the commands may be operated in different order.

Commands 302 include the following instructions for operating, for example synchronically, the units of each drum 214A, 214B and 214C:

operate the drum cleaning unit 217A, 217B and 217C;
operate the electrostatic charging unit 219A, 219B and 219C; and
operate the hopper units 213A, 213B and 213C Commands 303 include one or more instructions for operating the drums engines. In some cases, commands 303 include speed control instructions and position instruction. For example, the controller can give an order to the drum to turn to the point at which it is desirable to have the powder attached to the drum so that the powder sticks to the receiving plate 218 in the place needed for exact layer deposition in the working chamber 290.

Commands 304 include data for directing the energy scanning units to selected points (e.g. in pixels) on each drum surface to form the desired image, by for example electrophotographicly exposing the selected points on the drums surface. The data may include sliced 2D images of the 3D model for each drum. For example, FIG. 2C shows a sample cross section 2D image of 3D object 293 created, for example by fusing the multiple layers 297 including the three different materials 207A, 207B and 207C.

Each of the commands 302-304 operate the drums and respective scanning units.

Commands 305 comprise one or more instructions for operating the delivery plate 218 for receiving the dispensed powder from drums 214A, 214B and 214C and transporting the received powder for fusing or pressing at the working chamber 290. Command 305 may include the following instructions:

Move the delivery plate to the related position (e.g. P0, P1 . . . P5);
charge the delivery plate;
discharge the delivery plate;
operate the delivery plate's cleaning unit 247.

Commands 306 comprise instructions for controlling and synchronizing the position and speed of the delivering plate 218 and the carrier plate 291. For example, the instructions include the drums engine roaring speed synchronized with the lifting rate of the carrier plate engine.

Commands 307 includes data in the form of for example one or more images of the sliced layers of the 3D object (e.g. object 293) for selectively fusing the powder layers at the working container 290. And operate the energy unit 295 (or pressing unit) of the working chamber for fusing the delivered powder.

Figure 4A:
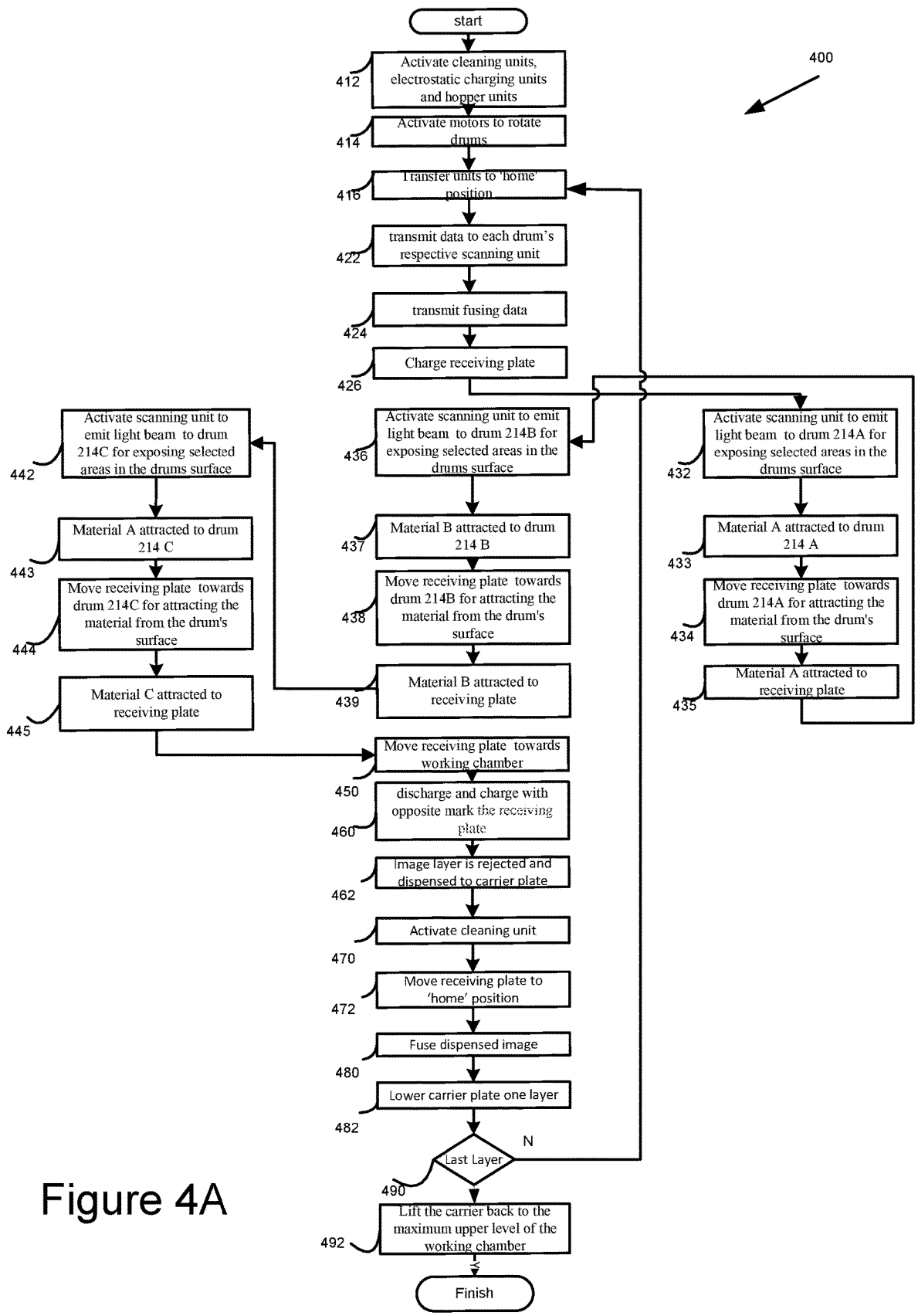
FIG. 4A shows a flow chart of a method for delivering one or more materials using electrophotography methods, in accordance with embodiments.

FIG. 4A shows a flow chart of a method 400 for delivering one or more materials using electrophotography and electrostatic methods, in accordance with embodiments. The method relates to a delivering system comprising three drums but may also relate to any other delivery system comprising less or more than three drums.

Figure 4B:
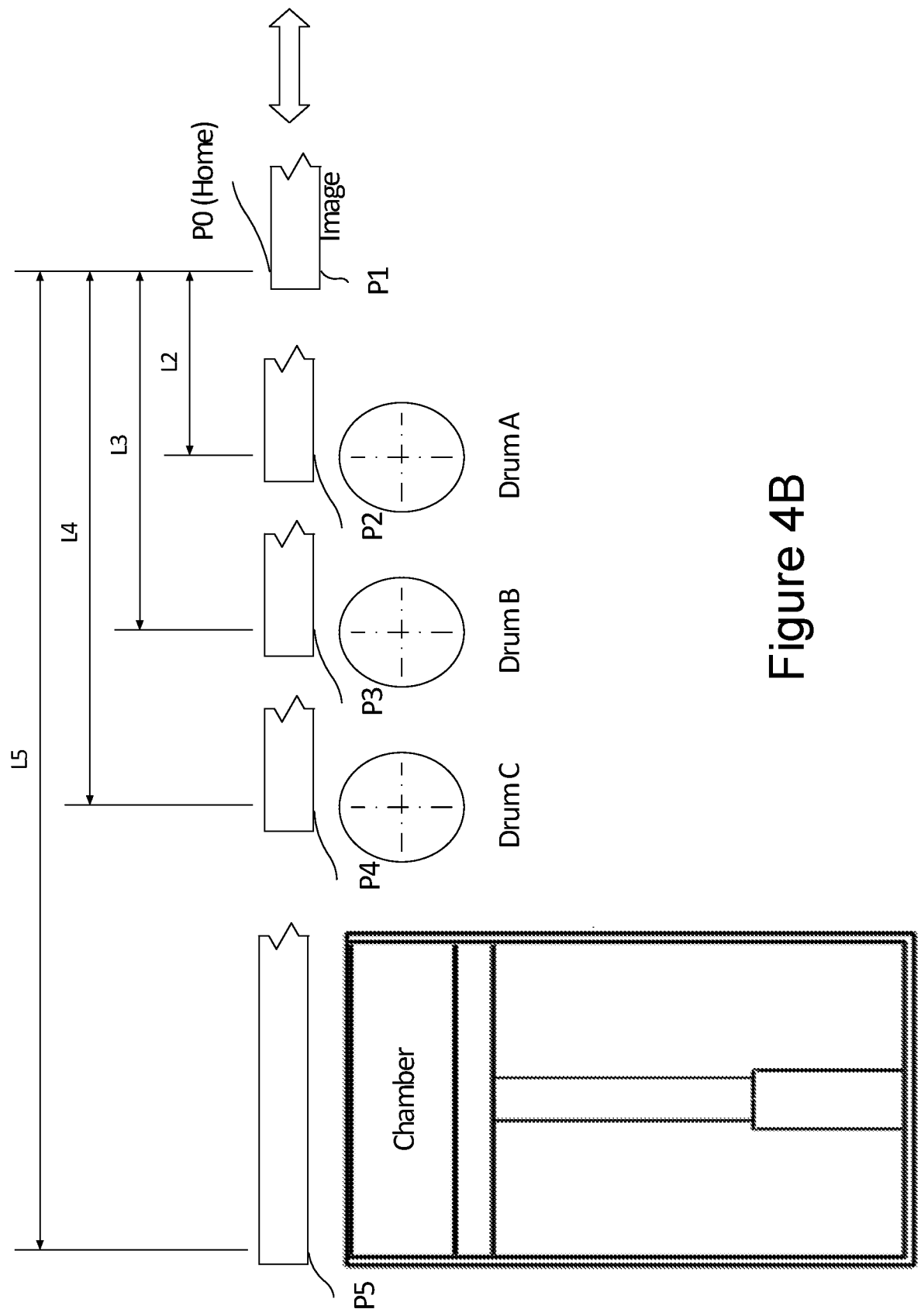
FIG. 4B is a schematic diagram illustrating the delivery plate at various phases, in accordance with embodiments.
Figure 4C:
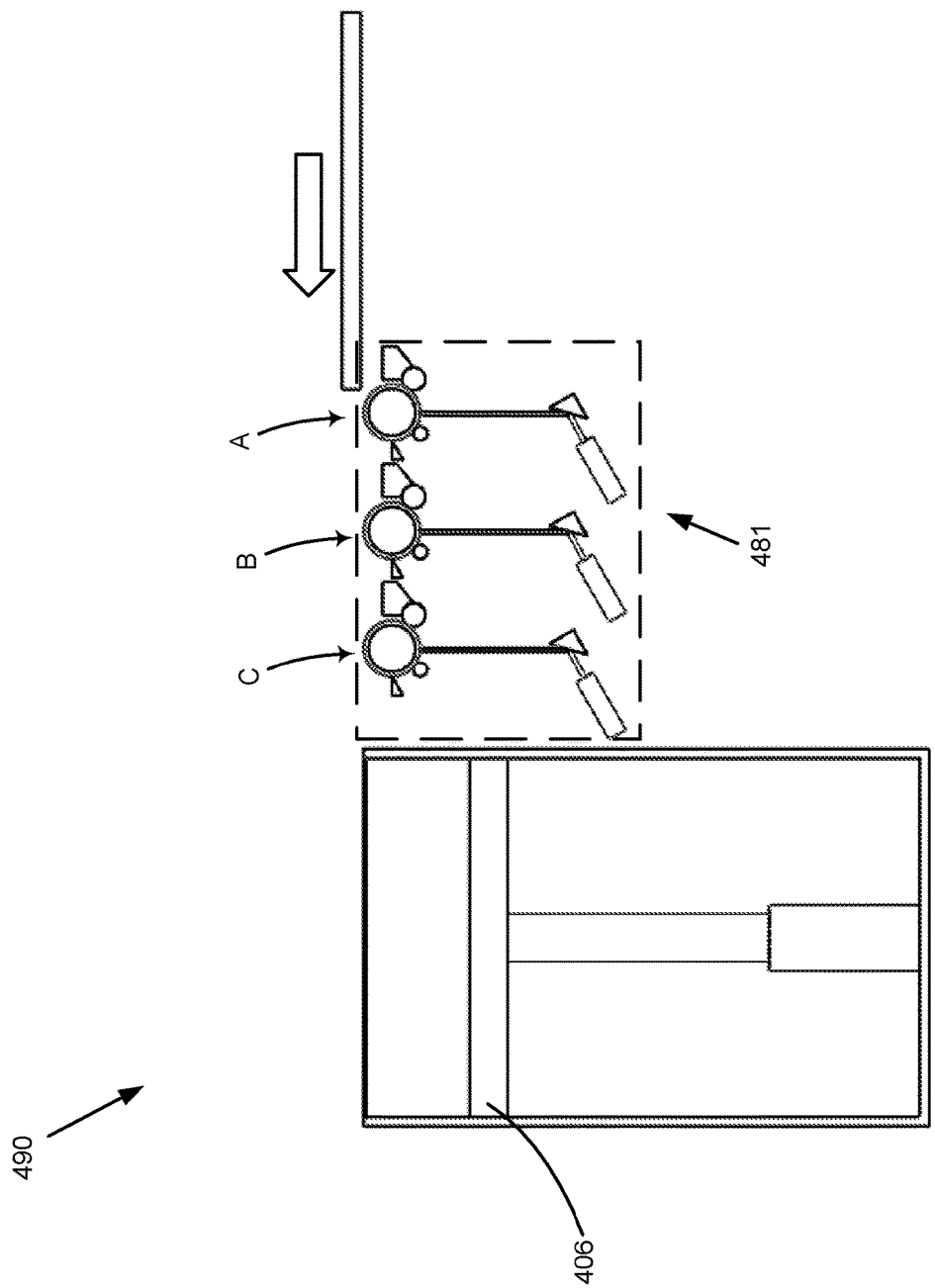
FIG. 4C is a schematic diagram illustrating the delivery system at home position, in accordance with embodiments.

At steps 412-414 the system units are activated. The activation phase includes the following steps: at step 412 the cleaning units, electrostatic charging units and hopper units of each drum are activated. At step 414 the motor 201 of each respective drum is activated for rotating each drum according to a predefined speed. At step 416 the units are transferred to 'home' position prepared for transferring one or more types of materials to the working chamber 290. For example, FIG. 4C illustrates a perspective view of 3D printing system 400 at 'home' position ready for delivering three types of materials (e.g. powders A, B and C) to the working chamber 490. The working chamber 290 may be located on the distal left side of the 3D printing system 400 in proximity to the left side of the delivery system 481 and therefore on 'home' position the delivery plate 218 is located on the distal right side in proximity to the right side of the delivery system 481. Accordingly, the carrier plate 406 is position at the upper level of the working chamber 490 for receiving the first powder layer from the delivery system 481.

At the following phase as illustrated at steps 422-428 the layer dispensing cycle starts. At step 422 data is transmitted from the controller to each drum respective scanning unit. The data includes the 3D CAD file data sliced to a 2D image of each layer of each material for generating an image of discharged area on the surface of each drum for accordingly electrically attaching the materials based on the data to each drum. At step 424 data (e.g. image fusing data) is transmitted from the controller to the fusing unit. The data comprises information in the form of for example one or more images of the sliced layers of 3D part for selectively fusing the powder layers at the working container. At step 426 the delivery plate 218 is charged, for example positively by for example charger 237 for attracting the dispensed powder from the drums' rotated surfaces 216A, 216B and 216C.

At the following steps the charging units 241A, 241B and 241C are successively operated for respectively electrostatically charging the surfaces as the drums are rotating (for example anticlockwise) for attracting the materials from the hopper units. Accordingly, the delivery plate 218 moves forward in the direction of arrow 232 towards and above (e.g. tangentially) the drums for electrostatically attracting the powder layers from the rotating drums. Specifically, at step 432 energy scanning unit 270A is activated to emit light beam to drum 214A for exposing selected areas in the drums surface and at step 433 the material 207A from hopper unit is accordingly attracted to the exposed area on the drums surface. At step 434 the delivery plate moves towards and above the first drum 214A for attracting at step 435 the material from the drum's surface. For example, as illustrated in FIG. 4B, the delivery plate moves from point P1 to point P2 which is located at a distance L2 from P0 above the first drum 214A and attracts the material 207A from the drum 214A to the delivery plate surface. P1 may be defined as the starting powder image point on the delivery plate.

According to some embodiments the delivery plate velocity is:

$$V\text{-speed of plate}=N*D*PI \text{ (M/Min)}$$

where:
D—external drum diameter (M)
N—rotation speed of drum (RPM)

At step 436 scanning unit 240B emits light beam to drum 214B for exposing selected areas in the drums surface B and for attracting at step 437 the material from the drum's surface. At step 438 the delivery plate continues moving towards the second drum B for collecting the second material. Specifically as illustrated in FIG. 4B, of the delivery plate moves from point P2 to point P3 which is located at a distance L3 from P0 above the second drum 214B and attracts material 207B from the drum 214B to the delivery plate 218 surface. At step 439 the material 207B from hopper unit 209B is accordingly attracted to the exposed area on the drums surface. At step 442 scanning unit 270C emits light beam 443C to drum 214C for exposing selected areas in the drums surface C and for attracting at step 443 the material from the drum's surface. At step 444 the delivery plate 218 continues moving towards the third drum C for collecting at step 445 the third material 207C. Specifically as illustrated in FIG. 4B, the distal end of the delivery plate moves from point P3 towards point P4 which is located at a distance L4 from P0 above the third drum 214C and attracts material 207C from the drum 214C to the delivery plate surface.

In some cases, the powder may be delivered from the one or more drums to the receiving plate 218 simultaneously, in order to shorten the delivering process time. For example, step 439 may be operated as step 435 is still in operation, accordingly step 445 may be in operation as both steps 435 and 439 are still in operation.

Following the accumulation of all layers of material by the delivery plate 218 from the respective drums the delivery plate 218 continuously moves at step 450 from point P4 towards the working container 290 and point P1 of the delivery plate is positioned at point P5 so the material image attached to the bottom section of the delivery plate is placed above the working chamber (e.g. covering the working chamber cavity). At step 460 the delivery plate 218 is discharged and charged with opposite mark (e.g. switching the electrical polarity of the delivery plate) and as a result at step 462 the layer of material is electrically rejected from the delivery plate 218 and dispensed on the carrier plate 206. At step 470 the cleaning unit is activated and at step 472 the delivery plate moves back from point P5 to pint P0 (home position) as the cleaning unit removes left over powder or non-transferred portions of the material image which were not dispensed to the working container. At step 480 the dispensed powder layer is fused by the energy unit laser head and at step 482 the carrier plate 291 (holding the currently fused powder) is lowered in the vertical (Y) axis in a layer thickness S.

At step 490 a binary decision can be made regarding the index number of dispensed layer. If it is the final layer (e.g. all 3D object layers were transferred and fused at the working chamber) than the printing process is completed and at step 492 the carrier lift is lifted back to the maximum upper level of the working chamber 490. If it is not the final layer than the process continues for delivering the next layer at step 416.

Figure 5:
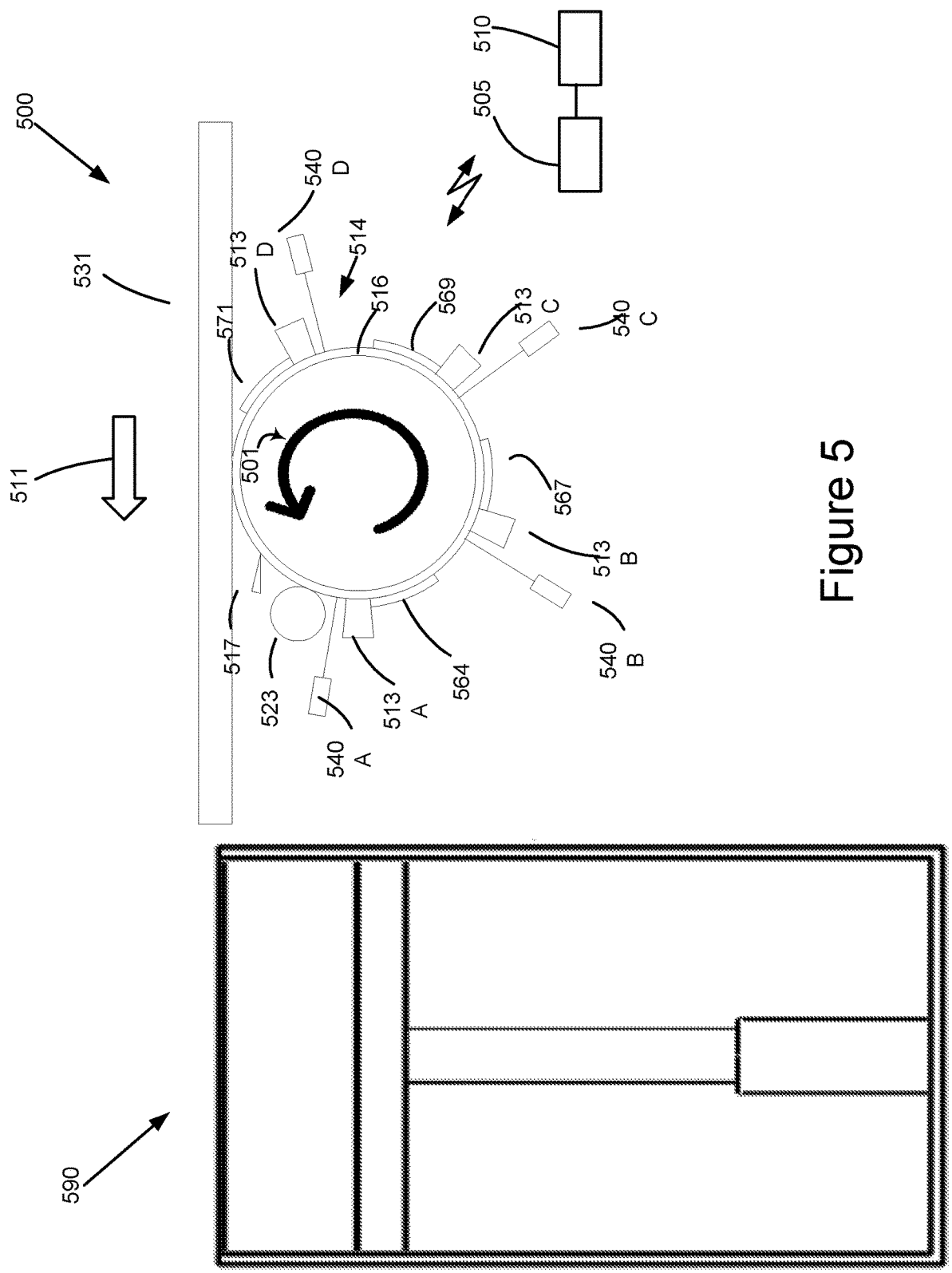
FIG. 5 is a schematic diagram illustrating a multiple material delivery system comprising a single drum configured to deliver multiple materials to a three-dimensional printing system using electrophotography methods, in accordance with embodiments.

FIG. 5 shows a multiple material delivery system 500 configured to deliver multiple materials to a three-dimensional printing system using electrophotography methods, in accordance with embodiments. The system 500 comprises a single photoconductive drum 514 configured to rotate, for example anticlockwise, by one or more motors in accordance with a predefined rotating speed. In some cases, the drum is rotated in a constant rate. The drum may have a cylinder shape or other shapes and may include or may be made of conducting material such as copper, aluminum, an organic photoconductor made of N-vinylcarbazole (e.g. an organic monomer) or the like. The drum 514 includes a surface, such as a photoconductive surface 516 coated with one or more photoconducting materials such as selenium or the like and configured to be electrostatically charged by charging means, for example by an electrostatic charger 523.

According to some embodiments the system 500 comprises a plurality of hopper units for supplying different types of materials to be electrically attached to the drum surface 516. The system 500 further comprises a plurality of respective scanning units for discharging selective locations on the surface in accordance with a predefined image structure.

Specifically, according to some embodiments, the system comprises four hopper units 513A, 513B 513C and 513D positioned around the circumferential surface 516 for covering the drum's perimeter and respective scanning units for marking selected location on the drum surface 516. More specifically, each of the hopper units 513A, 513B 513C and 513D comprises accordingly containers for storing accordingly materials, for example four different types of powder materials and one or more channels for releasing the powder attracted by the charged rotated surface. According to some embodiments, each of the hopper units 513A, 513B 513C and 513D comprises a drum configured to receive the powder from the container and to rotate while the powder is electrically attached to the uncharged areas on the drum 514 (e.g. according to the laser marks) and rejected from charged areas on the drum.

The drum 514 may comprise on its radial surface a cleaning unit 517 which is in communication with the rotated drum for cleaning the drum 514 from particles left from previous printing cycles. In some cases in proximity to the cleaning unit 517 the system 500 may comprise a discharger/charger unit 523 (e.g. corona wire, scorotrons, charging rollers, and other electrostatic charging devices) for discharging/charging the drum 514 for example by directing a light beam to the surface 516.

In many embodiments, the principle of operation of the delivery system comprises one or more of the following attributes. The drum 514 rotates while the discharger/charger unit 523 charges the drum. At the following step the drum is scanned by a first scanning unit such as the scanning unit 540A by emitting a light beam (e.g. laser beam) which creates an image on the drum. As the laser hits the drum, specific areas in the drum are discharged, according to the image. Following the drum charging, the first hopper unit 513A comprising for example a drum having a negative charged powder, rotates while powder portion 564 of a first type of material is electrically attached to the uncharged areas on the drum 514 (e.g. according to the laser marks) and rejected from areas on the drum comprising negative charge. At the next step, as the drum rotates in the direction of arrow 501 scanning unit 540B emits light, for example sequentially, towards the drum for electrically attaching powder portion 567 of a second type. Accordingly, powder portion 569 and powder portion 571 of a third and fourth types are electrically attached to the surface by energy scanner units 540C and 540D. At the next step, for example as a first rotation cycle is completed, a delivery plate 531 which is for example positively charged approaches the drum (e.g. moves above tangentially in respect to the drum 514) for receiving the dispensed powders portions 564, 567, 569 and 571 and transferring them in the direction of arrow 511 towards a working container 590 for generating a first layer of powder comprising a plurality of material such as material A, B, C and D.

Figure 6:
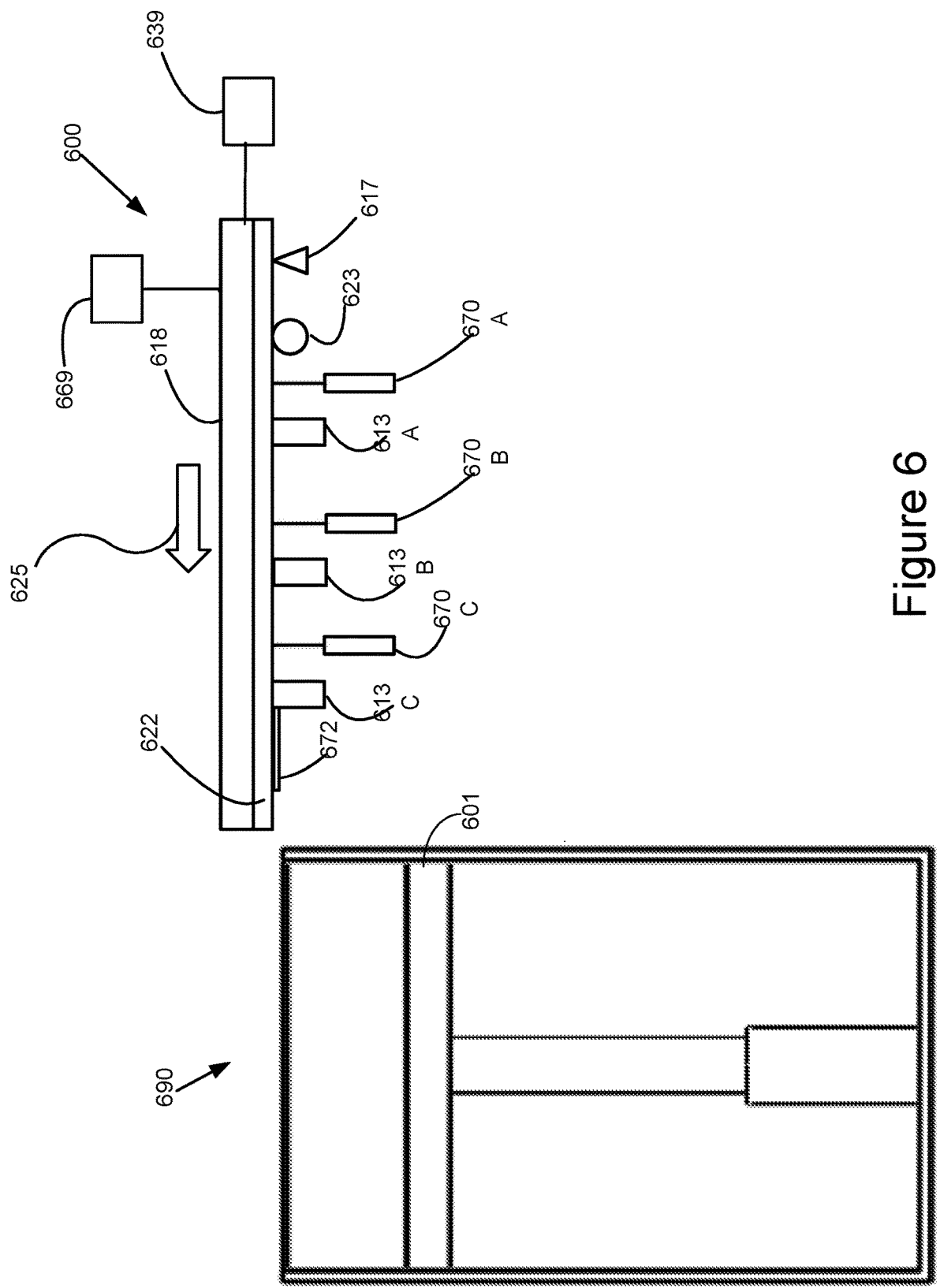
FIG. 6 shows a schematic diagram of a multiple material delivering system, in accordance with another embodiment.

FIG. 6 shows a schematic diagram of a multiple material delivering system 600 in accordance with another embodiment. The delivering system 600 comprises a delivery plate, such as photoconductive plate 618 having a photoconductive surface 622 configured to directly attract multiple materials, for example in a powder form, and deliver the materials to a working chamber 690. The delivery plate 618 may move in the direction of arrow 625 using one or more engines such as a linear actuator 639 for activating and moving the delivery plate in a predefined speed for collecting the materials and delivering them to the working chamber 690.

According to some embodiments, the system 600 comprises a plurality of hopper units and scanning units, such as the units shown in FIG. 2C, located below the delivery plate 618. For example, the system 600 may include three hopper units 613A, 613B and 613C for supplying three different types of materials (e.g. in the form of powder) to be electrically attached to the surface 622. The system further comprises respective scanning units, for example three scanning units 670A, 670B and 670C for emitting light beams and discharging selective locations on the surface in accordance with a predefined image structure.

The system 600 further comprises a cleaning unit 617 located below at the distal right end of the delivery plate 618 for cleaning the delivery plate 618 from particles left from previous printing cycles. In some cases, in proximity to the cleaning unit 617 the system 600 may comprise a discharger/charger unit 623 (e.g. corona wire, scorotrons, charging rollers, and other electrostatic charging devices) for discharging/charging the plate 618 for example by directing a light beam to the surface 622.

In many embodiments, the principle of operation of the delivery system comprises one or more of the following attributes. The delivery plate 618 is charged by charger 623 and moves in the direction of arrow 625 to and above the first scanning unit 670A which scans (e.g. discharge) selected areas on the bottom surface 622 of the delivery plate 618 by emitting a light beam (e.g. laser beam) which creates an image on a portion of the required area on the delivery plate bottom surface 622. As the light beam hits the surface 622, specific areas of the surface 622 are discharged and accordingly a first type of material is electrically attracted from the hopper unit 613A and electrically attached to the uncharged areas on surface 622. At the following step the delivery plate 618 continues moving to a second scanning unit 670B which emits light towards the surface 622 for electrically attaching a second type of material. Accordingly a third type of material is electrically attached from the hopper unit 613C to the surface 622 by a third scanning unit 670C which completes the formation of a powder layer image 672 including three types of material attached to the bottom of the surface 622. At the next step, the delivery plate 618 moves to the working chamber 690 and once the plate 618 is located directly above the working chamber 690, the delivery plate 618 is charged with opposite mark, for example by power unit, for example discharger unit 669, and as a result the powder layer image 672 is electrically rejected from the delivery plate 618 to a working plate 601 of the working chamber 690. At the end of the cycle the dispensed layer is for example fused and the delivery plate 618 moves back for delivering the next layer of the 3D object. According to some embodiments, as the delivery plate 618 moves back the cleaning device 617 removes particles left from previous printing cycles.

Figure 7:
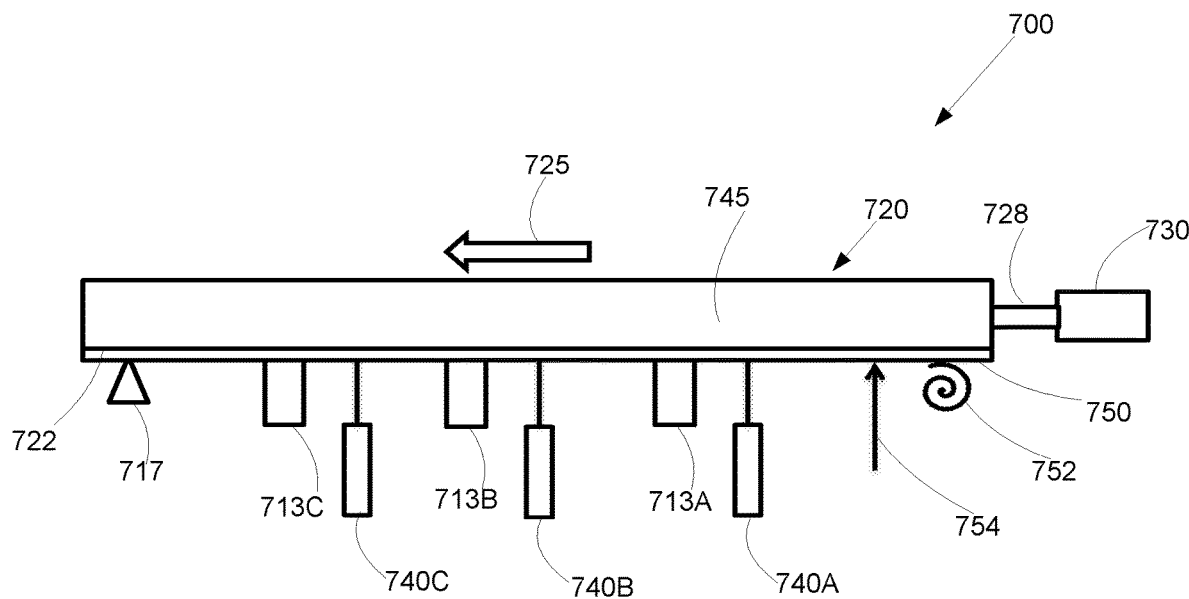
FIG. 7 shows a schematic diagram of multiple material delivering system using vacuum in accordance with embodiments.

FIG. 7 shows a schematic diagram of multiple material delivering system 700 in accordance with embodiments. System 700 includes a delivery plate 720 configured to attract and hold one or more materials for example at the bottom 722 of the delivery plate according to a predefined sliced 2D image of a 3D object. The system 700 utilizes vacuum methods for receiving, holding and transferring the received materials to a working chamber. Specifically, the delivery plate 720 comprises a sealed cavity 745 and inlet pipe 728 for connecting the delivery plate 720 to a pump 730 such a vacuum or suction air pipe for sucking air from the sealed cavity 745 forming low pressure inside the cavity compared to the outside pressure and creating a vacuum-sealed cavity 745. The system 700 further comprises a sealing material 750 for covering and sealing the bottom of the delivery plate 720. In some embodiments, the system 700 includes an automatic sealing tape roller 752 for rolling, storing and attaching the sealing material. The automatic sealing tape roller 752 is configured to automatically release the sealing material, for example at the beginning of each delivery cycle, according to instructions received from a controller, and attach the sealing material to the delivery plate 720 (e.g. delivery plate bottom). The system further comprises a cutting tool 754 for automatically cutting the sealing material at predefined points (e.g. the cut is performed after each layer of material is transferred to the working chamber as the used sealing material already has holes and is therefore unusable). In some cases, the cut used material is collected into a waste container and a new sealing material is attached to the lower part of the plate. In some embodiments, the automatic sealing tape roller 752 and the cutting tool 754 are located in proximity to one another and are attached to the bottom distal end of the delivery plate 720. In some cases, the sealing material may be made of thin nylon or other materials such PVC and LDPE having a thickness of between 10 to 50 microns and have the size and shape for sealing the delivery plate bottom 722. For example, the delivery plate 720 may have rectangular shape between 50 to 70 cm in width and accordingly the sealing material may have a compatible size for covering the bottom of the delivery plate 720. The automatic sealing tape roller 752 can be of any type known in the art tape comprising a rotating drum. Non-limiting examples of suitable tapes include a motor that is attached to the axle of the sealing roller and released rotationally according to the speed of the movement of the plate.

According to some embodiments, the system 700 comprises a plurality of hopper units and scanning units, such as the units shown in FIG. 2C, located for example below the delivery plate 720. For example, the system 700 may include three hopper units 713A, 713B and 713C for supplying for example three different types of materials to be attached by suction to the surface 722. The system 700 further comprises respective scanning units, for example three scanning units 740A, 740B and 740C for emitting light beams to form holes in selective locations on the sealed surface in accordance with a predefined image structure. The system 700 further comprises a cleaning unit 717 located, for example below in the distal left end of the delivery plate 720 for cleaning the delivery plate from particles left from previous printing cycles.

Figure 8:
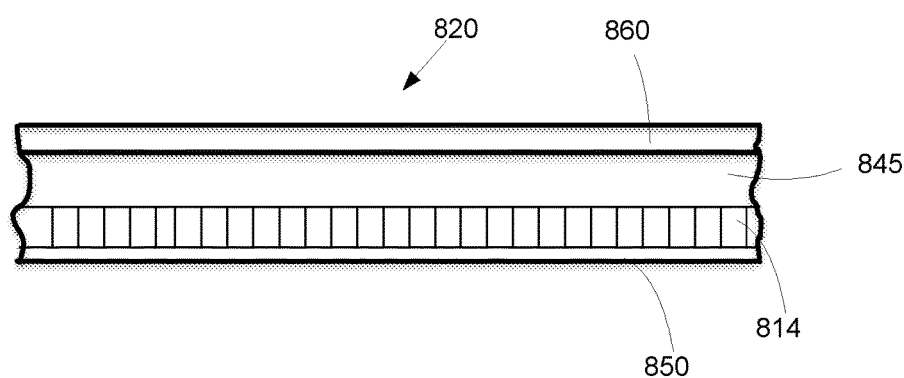
FIG. 8 shows a schematic diagram of cross-section of the delivery plate of FIG. 7, in accordance with embodiments.

FIG. 8 shows a schematic diagram of cross-section of the delivery plate 720 of FIG. 7, in accordance with embodiments. The delivery unit 820 may comprise an upper sealing layer 860, a cavity 845 having low air pressure in respect to external air pressure, a bottom layer comprising a plurality of holes 814 and a sealing layer comprising a sealing material 850 for covering the bottom layer (e.g. and holes 814). According to some embodiments, the size of each hole 814 is smaller than the size of a single grain of powder for blocking the passage of powder into the cavity 845 but allowing air to pass through the holes 814 into the cavity 845. For example, in some cases, the dimeter of a single grain of powder may be in the range of 10 to 20 microns, accordingly the diameter of each hole 814 should be less than 10 microns for preventing the access of powder into cavity 845.

In some cases, the sealing layer may be made of elastic material such as rubber and the bottom layer may be made of ceramic or other low friction material.

Figure 9A:
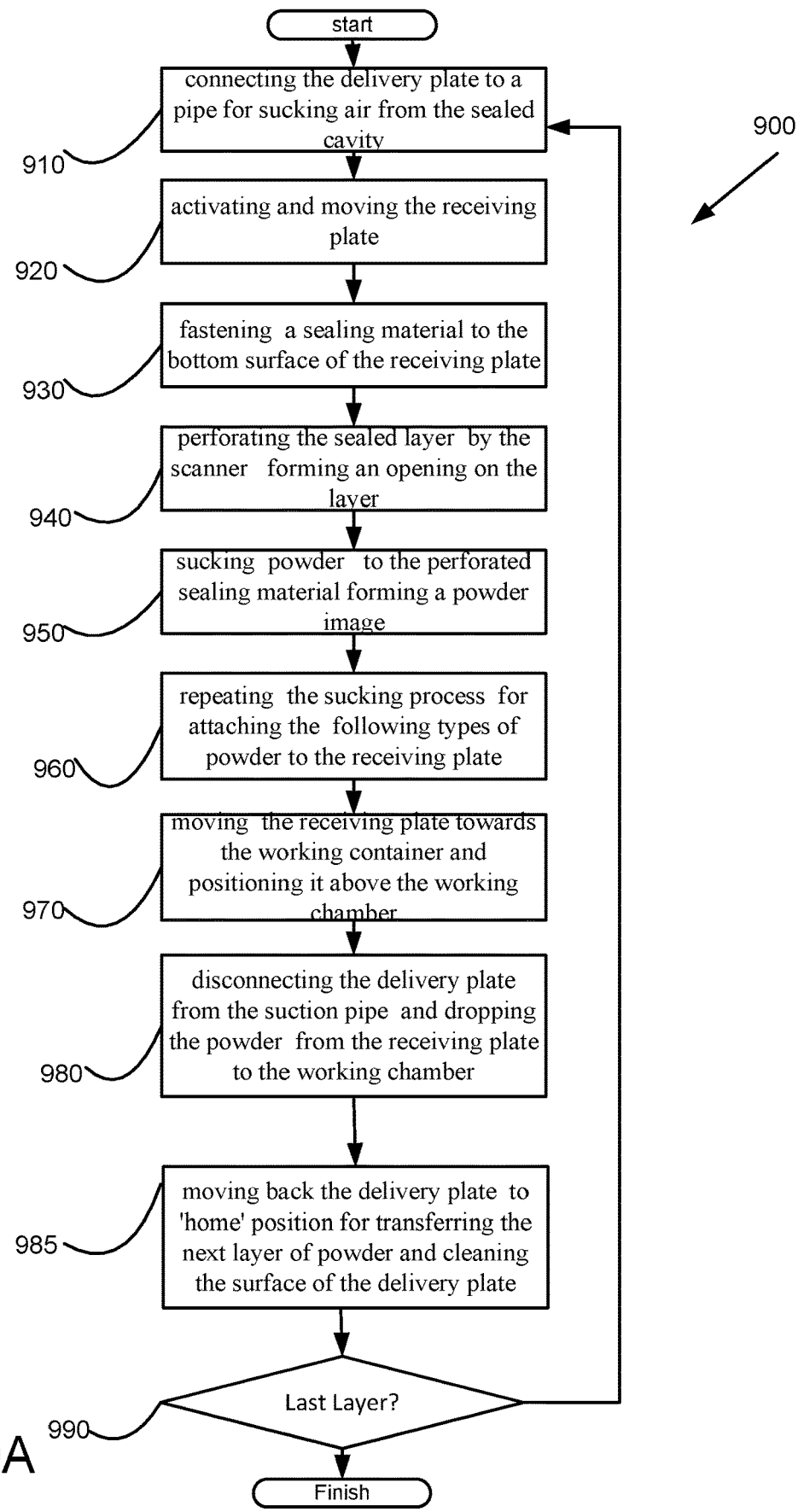
FIG. 9A shows a flow chart of a method for delivering multiple materials using vacuum methods, in accordance with embodiments.
Figure 9B:
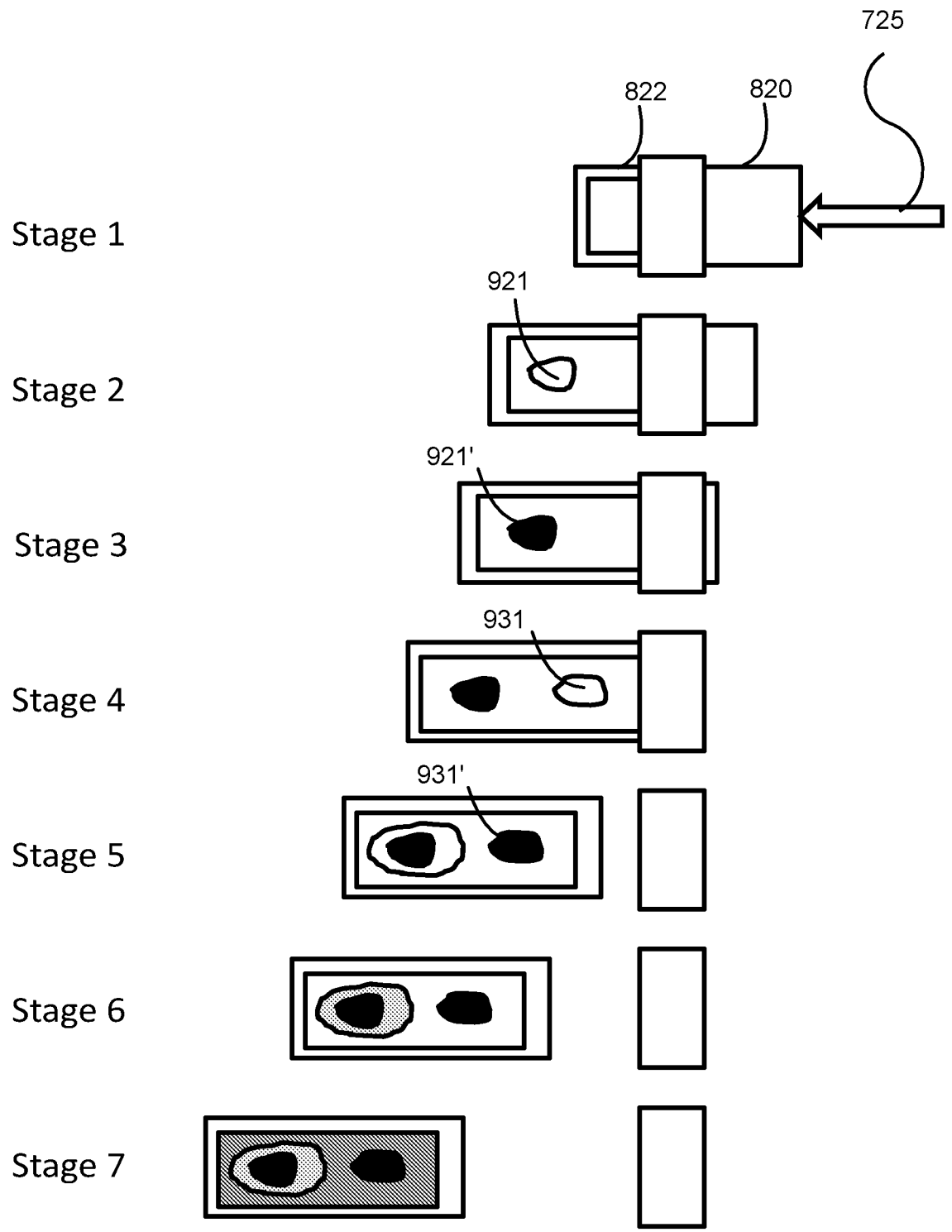
FIG. 9B illustrates a schematic top view of the delivering system status at each delivering step, in accordance with embodiments.

FIG. 9A shows a flow chart of a method 900 for delivering multiple materials using vacuum methods, in accordance with embodiments. FIG. 9B illustrates a schematic top view of the delivering system 700 status at each delivering step, in accordance with embodiments. At step 910 a vacuum-sealed cavity is created, for example by connecting the delivery plate to a pipe for sucking air from the sealed cavity. At step 920 the delivery plate is activated and moved, for example in the direction of arrow 725 to a working chamber. At step 930 a sealing material 850 (e.g. Nylon) is fastened, for example to the bottom surface of the delivery plate. In some cases, as illustrated in FIG. 9B stage 1, the sealing material 850 is released from the automatic sealing tape roller 752 and fastened to the delivery plate. At step 940 the sealed layer is perforated forming an opening on the layer (e.g. plurality of nylon holes) on the sealed surface according to a predefined image. In some cases, the holes are formed by one or more scanners, such as laser sources configured to emit a laser beam to selected areas on the sealed surface for forming an image on the surface. For example, as illustrated in FIG. 9B stage 2 a first hole 921 is formed by a scanner (e.g. scanning unit 840A) at the bottom surface of the delivery plate. At step 950 the powder is sucked to the perforated sealing material forming a powder image. Specifically, as illustrated in FIG. 9B stage 3, once the delivery plate passes over the first hopper unit 813A, a first type of powder is sucked from the hopper unit to the holes 814 located at the bottom surface of the delivery plate. As the holes size is smaller than the powder size, the powder remains on the surface of the plate forming an image 921'. At step 960 the sucking process is repeated for attaching the following types of powder to the delivery plate according to the predefined image. For example, as illustrated in FIG. 9B stages 3-6, the second type of powder is sucked to holes 931 forming a powder image 931'. At step 970, following the accumulation and attachment of all materials (e.g. A, B and C) by the delivery plate from the respective hopper units the delivery plate continuously moves towards the working container and positioned above the working chamber so the image of powder attached to the bottom section of the delivery plate is placed above the working chamber (e.g. covering the working chamber cavity). At step 980, the suction pipe is disconnected from the delivery plate and/or switched off and as a result the powder drops from the delivery plate to the working chamber. At step 985 the delivery plate is moved back to 'home' position for transferring the next layer of powder. Additionally, the delivery plate surface is cleaned by the cleaning unit 717, for example as the delivery plate moves back to the 'home' position At step 990 a binary decision can be made regarding the index number of dispensed layer. If it is the final layer (e.g. all 3D object layers were transferred and fused at the working chamber) than the printing process is completed and the carrier lift is lifted back to the maximum upper level of the working chamber 490. If it is not the final layer than the process continues and the receiving layer moves back to step 920 for collecting and delivering the next layer.

Compressing Methods and Systems for Forming a 3D Object

Various methods and systems for three-dimensional object production of hard metals such as carbide tungsten have become available in recent years. One of the most common methods for 3D metal production process is Die Pressing. The method includes compressing metal in the form of powder into a dense metal powder form and sintering the compressed form to yield a 3D metal object. The compression step is required to avoid hollow areas and sections in the complete formed product following the sintering phase.

Specifically, powder such as hard metal or carbides or titanium are formed into desired shapes by means for pressing such powder between a pair of press dies or punch and die assemblies. The dies employed in such a pressing method are required to be highly accurate dimensionally.

Figure 10:
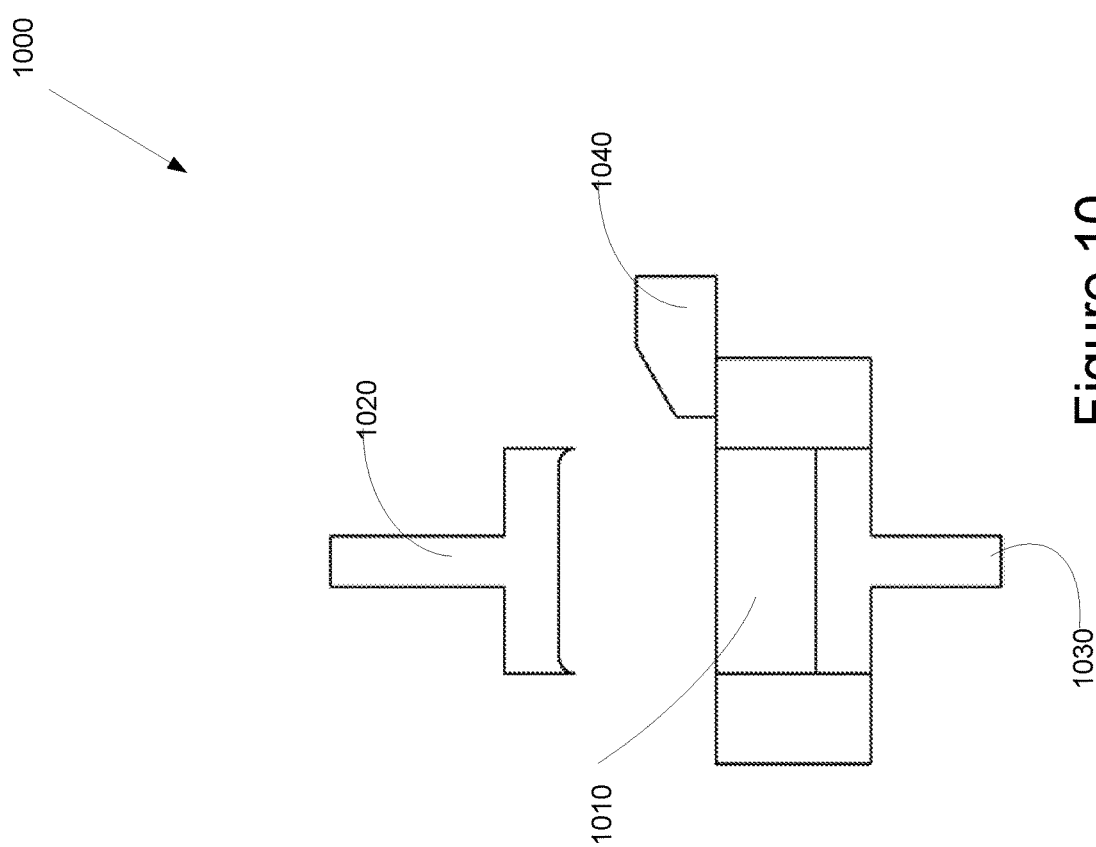
FIG. 10 is a cross section view of a die pressing system 100, in accordance with the prior art.

FIG. 10 is a cross section view of a die pressing system 1000, in accordance with the prior art. The system comprises a die cavity 1010 for receiving metal dispensed in the form of powder from a hopper 1040, a top punch 1020 and bottom press 1030 for pressing the dispensed powder. In operation, the metal powder is fed into the die cavity 1010 by hopper 1040 (e.g. shoe hopper) till the die cavity 1110 is filled. At the following step, the top punch 1020 presses downwards the powder, forming a dense powder form. Thereafter, the top punch is lifted out of the die cavity 1010 while the bottom punch moves up for releasing the compact powder from the die cavity. Accordingly, each compact powder is transferred to a sintering process for completing the solidifying process. The delivering process is repeated for each received metal powder.

The prior compression methods and systems can be less than ideal in at least some respects. Prior 3D compression methods comprises specific predefined fixed cavity model according to the requested product for generating the requested 3D object, therefore, a rounded shape model may obviously not be used for forming a 3D square shaped object.

Additionally, due to difficulties in placing the powder in several die casts effectively, prior compression methods and systems usually provide a single object at each compression operation cycle, while the present methods and systems may compress simultaneously a plurality of separated 3D objects in a single compression cycle.

Figure 11:
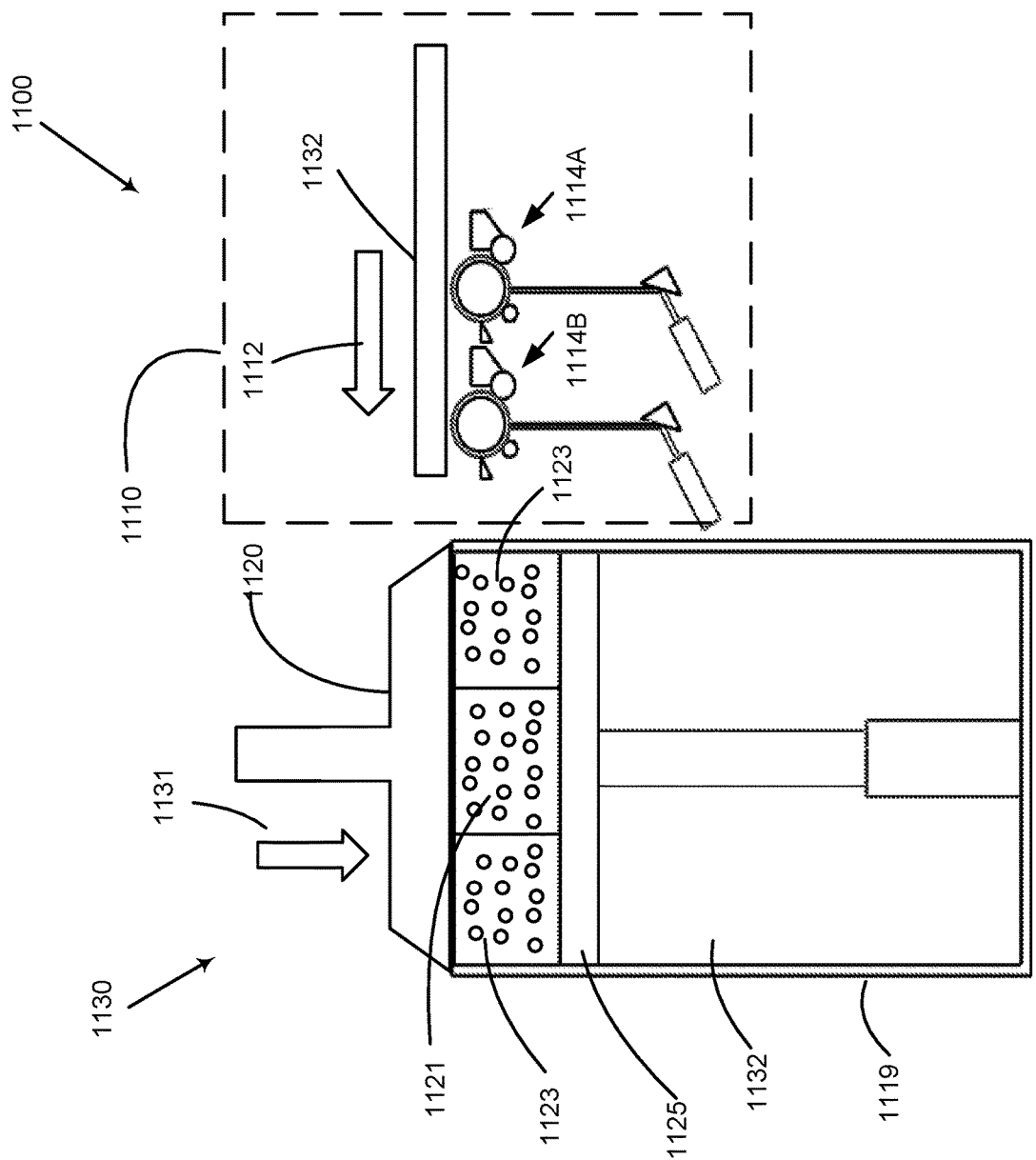
FIG. 11 is a schematic diagram illustrating a system for generating a 3D object, in accordance with embodiments.

FIG. 11 is a schematic diagram illustrating a system 1100 for generating one or more 3D objects, in accordance with embodiments. System 1100 present all elements of aforementioned system 260 of FIG. 2C, but instead of an energy unit 295, system 1100 comprises a compressing system 1120 for forming a 3D dense powder object. Advantageously, the compressing system doesn't require a predefined model for generating the 3D object and may form the 3D object by building up three-dimensional objects using at least two materials according to computer data descriptive of the 3D object and dispensing successive layers of unsolidified materials to the pressing system. Additionally, the systems and methods of the present invention may generate 3D objects comprising complex geometry which may not be manufactured according to prior art methods due to geometric limitations of extrusion. For example, the 3D objects may include an inner cavity space which is not accessible from the outside. These geometries can be significant for the heat dissipation of hard metal cutting tools, such as knives. Specifically, thermal stresses are the most significant failure factor in these tools. Moreover, most of the erosion of these knives is caused by heating the knife as a result of friction during the cutting, using exceptional shapes that include internal lines to transport liquid coolant can reduce the heating of the knife and thus extend the length of time of use.

According to some embodiments, system 1100 comprises, a delivery system such as electrophotography delivery system 1110 configured to transfer successive layers comprising one or more unsolidified materials, for example in the form of powder to a working chamber 1119. The working chamber 1119 may include a compressing system 1120 comprising a container 1132 having a cavity, a receiving surface 1125 for receiving the successive layers (e.g. in the form of powder) and a top press 1130 for pressing each of the dispensed powder layers forming dense powder layers.

In some cases, the top press size should be a bit larger than the work surface so that it can compress an entire layer in one practice. The movement and power of the top press can be made for example by a mechanical motor or by pressure generated by a hydraulic piston.

According to some embodiments, the delivery system 1100 comprises a plurality of drums for dispensing multiple types of materials. For example, the system 1100 may comprise two drums 1114A, 1114B for dispensing two types of materials to an electrostatic delivery plate 1132 configured to receive the multiple materials and transfer the materials layer by layer to the working chamber 1120. For example, the first drum 1114A may dispense a first type of material 1121 (e.g. in the form of powder) comprising carbide for forming the shape of a 3D carbide object such as a carbide cutting tool and a second drum for dispensing a second type of material (e.g. in the form of powder) which may not be processed by sintering means such as a granular material. The granular material may be composed of finely divided rock and mineral particles such as sand or titanium nitrite used as shell or external support for the processed first material 1121.

In some cases, the second material has a higher sintering temperature than the first material and therefore does not fuse in the first material sintering temperature and remains in a powder form.

The successive layers comprising the two unsolidified materials may be transferred by the delivery plate 1132 to the working surface 1125 and may be compressed by the top press forming a dense powder. The compressed material may be transferred to a sintering system or heated locally at the working chamber 1119 using heating means which hardens the first material (e.g. carbide) while the second material remain in powder form and thus allows to extract the prepared 3D object.

Figure 12:
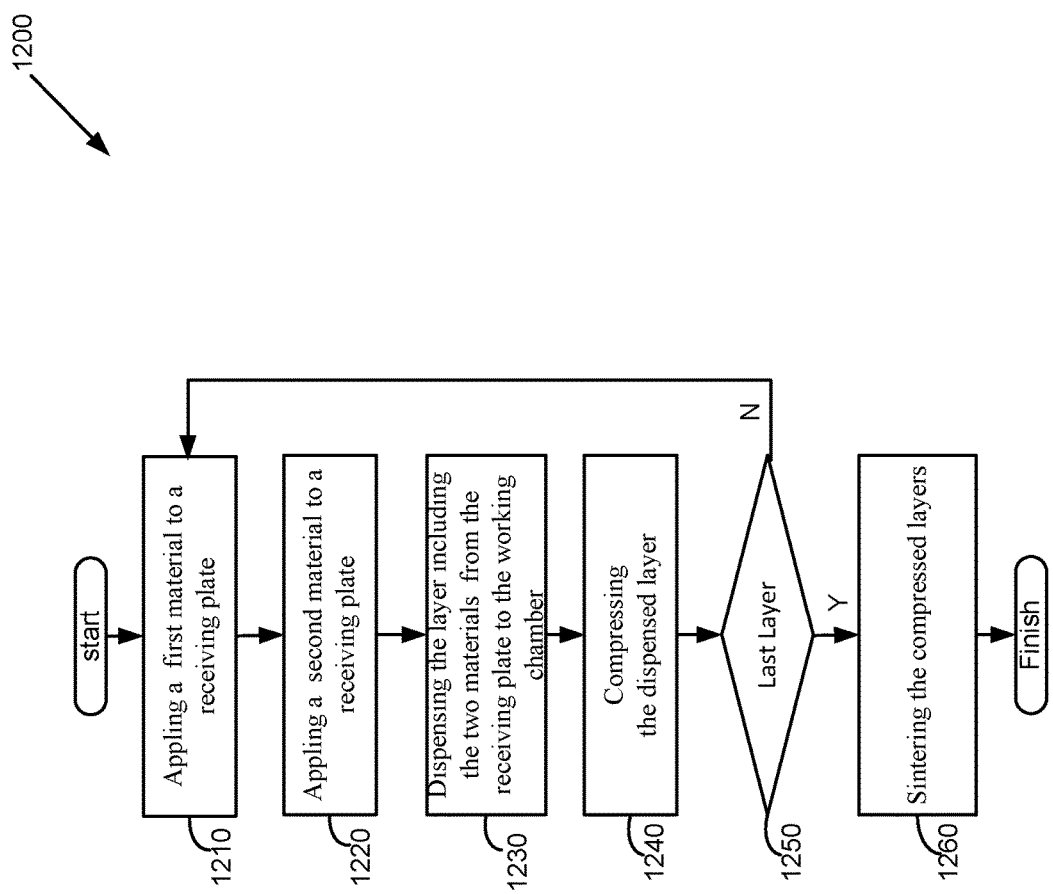
FIG. 12 shows a flowchart of a method for delivering at least two materials to a compression system and generating one or more 3D objects, in accordance with embodiments.

FIG. 12 shows a flowchart of a method 1200 for delivering at least two materials in the form of powder to a compression system and generating one or more 3D objects, in accordance with embodiments. At step 1210 a first powder material is applied to a delivery plate and at step 1220 a second material is applied to the delivery plate forming a layer including the two unsolidified layers. In accordance with embodiments, at least one of the materials (e.g. first material) is material that not sintered such as a granular material having a melting temperature which is high enough so that it is not affected by the sintering process forming the shell or frame for the 3D object formed from the other material (e.g. non granular material). For example, the sintering temperature of the granular material should be higher than the sintering temperature of the other (e.g. second) material. The two materials are dispensed to the delivery plate according to data received from one or more processors, such as computer control processors comprising information in the form of for example one or more images of the sliced layers of the 3D objects. The materials may be delivered using electrostatic methods as illustrated in FIGS. 2A-2C, or according to other methods and systems illustrated in FIGS. 5-8 for transporting the at least two materials to a compressing system. At step 1230 the layer including the two materials is dispensed from the delivery plate to the working chamber (e.g. to the working surface). At step 1240 the dispensed layer is compressed. For example, a top press 1120 moves down in the direction of arrow 1131 towards the working surface and presses the dispensed layer. At step 1250 a binary decision can be made regarding the index number of dispensed layer. If it is the final layer (e.g. all 3D object layers were transferred to the working chamber and compressed) than at step 1260 the compressed layers are sintered, for example using a sintering oven, forming the 3D object comprising one solid mass from one of the materials (e.g. the carbide material). If it is not the final layer than the process continues for delivering the next layer at step 1210.

In some cases, the sintering of powder layers comprise sintering the first powder material and the second powder material in a sintering temperature of the first powder material.

It is stressed that the use of two materials is simply an example of a possible 3D object that may be used. 3D objects comprising more than two material wherein one of the materials is a granular material could also be used.

It is also stressed that the components of the delivery systems as illustrated in FIGS. 2, 3 5-12 are desirably retained within an enclosable housing (not shown) that prevents ambient light from being transmitted to the components of the systems during operation.

While described herein as a drum, photoconductor drum may alternatively be a roller, a belt assembly, or other rotatable assembly.

The present disclosure provides computer control systems that are programmed to implement methods of the disclosure. FIG. 13 schematically illustrates an example of a computer system suitable for incorporation with the methods and apparatus in accordance with some embodiments of the present disclosure.

The computer system 1301 may be for example the host computer 282 or may include the processor or controller of FIG. 2. The computer system 1301 can process various aspects of information of the present disclosure, such as, for example, questions and answers, responses, statistical analyses. The computer system 1301 can be an electronic device of a user or a computer system that is remotely located with respect to the electronic device. The electronic device can be a mobile electronic device.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise conFigure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., a parent). Examples of remote computer systems and mobile communication devices include personal computers (e.g., portable PC), slate or tablet PC's (e.g., Apple® iPad, Samsung® Galaxy Tab), telephones, Smart phones (e.g., Apple® iPhone, Android-enabled device, Blackberry®), personal digital assistants, wearable medical devices (e.g., Fitbits), or medical device monitors (e.g., seizure monitors). The user can access the computer system 1301 with the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 2185 and stored on the memory 1310 for ready access by the processor 1305. In some situations, the electronic storage unit 1315 can be precluded, and machine-executable instructions are stored on memory 1310.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, questions and answers, analysis results, recommendations. Examples of UI's include, without limitation, a graphical user interface (GUI) and web-based user interface.

In further embodiments, the processing unit of the 3D printing system may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, Figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. Methods and systems of the present disclosure can be implemented by way of one or more algorithms and with instructions provided with one or more processors as disclosed herein. An algorithm can be implemented by way of software upon execution by the central processing unit 2305. The algorithm can be, for example, random forest, graphical models, support vector machine or other.

Although the above steps show a method of a system in accordance with an example, a person of ordinary skill in the art will recognize many variations based on the teaching described herein. The steps may be completed in a different order. Steps may be added or deleted. Some of the steps may comprise sub-steps. Many of the steps may be repeated as often as if beneficial to the platform.

Each of the examples as described herein can be combined with one or more other examples. Further, one or more components of one or more examples can be combined with other examples.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the method and apparatus of the present disclosure provided herein without departing from the spirit and scope of the invention as described herein.

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

What is claimed is:

1. A delivery system for delivering at least two types of materials to a working chamber, the delivery system comprising:
   at least two rotatable drums having a rounded photosensitive outer surface, wherein each of said at least two rotatable drums has associated therewith:
      a hopper unit comprising a container for storing respectively one material of said at least two materials, wherein the hopper unit is configured to dispense the one material on the photosensitive outer surface of the rotatable drum;
      one or more charging electrodes configured to charge the rotatable drum;
      a charging unit configured to charge the delivery plate; and
      a delivery unit comprising a movable delivery plate having a conductive surface, wherein said delivery unit is connectable to an engine for moving the delivery plate to the working chamber and wherein said delivery plate is configured to deliver simultaneously the at least two types of materials to the working chamber;
   wherein the movable delivery plate is further configured to:
      electrically and successively attract the at least two types of materials from the respective rotatable drum surface to the movable delivery plate conductive surface forming a layer comprising said attracted at least two materials; and
      transfer the layer to the working chamber by electrically rejecting the layer into the working chamber.

2. The system of claim 1, wherein the conductive surface is coated with one or more layers of insulating materials.

3. The system of claim 1, wherein each of said at least two types of materials comprises non-conductive or conductive powder materials.

4. The system of claim 1, wherein said hopper unit comprises one or more layers of insulating materials.

5. The system of claim 1, wherein each of said at least two rotatable drums comprises a cleaning unit configured to clean the photosensitive outer surface of said rotatable drum.

6. The system of claim 1, wherein said delivery unit comprises a cleaning unit configured to clean the surface of said delivery plate.

7. The system of claim 1, comprising a processor for synchronizing the movement rate of said delivery plate with the rotation speed rate of said at least two rotatable drums.

8. The system of claim 1, wherein the movable delivery plate is further configured to move synchronically to multiple points located respectively above said at least two rotatable drums.

9. A printing system for printing at least one 3D (three dimensional) object comprising a delivery system according to claim 1 and the working chamber.

10. The system of claim 9, wherein the working chamber comprises: a working surface configured to receive said at least two types of materials and be lowered step by step; and an energy head for fusing said at least two types of materials.

11. The system of claim 10, wherein said energy head is a laser head configured to apply a focused laser beam to a given area of each of layer of said plurality of layers corresponding to a selected cross-sectional area of a model of the molded 3D object, in accordance with the CAD cross-sectional data of the selected cross-sectional area of the model in such a way that each layer is fixed to the layer below.

12. The system of claim 9, wherein the printing system is a compressing system.

13. The system of claim 12, wherein the compressing system comprises:
   a container having a cavity;
   a receiving surface for receiving the plurality of layers from the delivery plate; and
   a top press for pressing the received plurality of layers and forming dense powder layers.

14. The system of claim 13, wherein said dense powder layers are sintered.

15. The system of claim 14, wherein one of said dense powder layers comprises a material which may not be sintered.

16. A delivery system for delivering at least two types of materials for printing at least one 3D object, the delivery system comprising:
   a delivery unit comprising a delivery plate having a conductive surface, said delivery unit is connectable to an engine for moving the delivery plate to a working chamber and wherein said delivery plate is configured to deliver simultaneously the at least two types of materials to the working chamber;
   a charging unit configured to charge the delivery plate; and
   at least two rotatable drums, wherein each of said at least two rotatable drums have a photosensitive surface for receiving respectively one of said at least two types of materials, and wherein each of said at least two drums has associated therewith:
      a hopper unit, wherein said hopper unit comprises a container for storing respectively one material of said at least two materials;
      a cleaning unit configured to clean the respective photosensitive surface of said plurality of rotatable drums;
      one or more charging electrodes configured to respectively apply electrostatic charge to the rotatable drum;

a scanning energy unit, wherein said scanning energy unit comprises an energy source configured to selectively emit a light beam towards the respective photosensitive surface of said at least two rotatable drums for discharging the photosensitive surface in accordance with a predefined image structure of the at least one 3D object;

wherein the delivery plate is configured to successively and electrically attract the at least two materials from said at least two rotatable drums forming at said delivery plate surface a layer of said at least two materials and transfer said layer to the working chamber by electrically rejecting the layers of material into the working chamber.

17. A delivery system for delivering a plurality of layers of a powder, wherein each layer of the plurality of layers comprises at least two types of materials, the delivery system comprising:

a delivery unit comprising a delivery plate having a conductive outer surface, said delivery unit is connectable to an engine for moving the delivery plate to a working chamber and wherein said delivery plate is configured to deliver simultaneously the at least two types of materials to the working chamber; and a plurality of rotatable drums having a rounded photosensitive outer surface for receiving respectively said at least two types of materials, wherein each of said plurality of rotatable drums has associated therewith:

a hopper unit comprising a container for storing respectively one material of said at least two materials, wherein the hopper unit is configured to dispense the one material of said at least two materials on the photosensitive outer surface of the rotatable drum;

one or more charging electrodes configured to charge the rotatable drum; and a charging unit configured to charge the delivery plate;

wherein the delivery plate is further configured to:

electrically and successively attract respectively the at least two materials from the plurality of rotatable drums surface to the delivery plate conductive surface forming a layer comprising said attracted at least two materials; and transfer the attracted layer to the working chamber by electrically rejecting the attracted layer into the working chamber.

18. A printing system for printing at least one 3D (three dimensional) object comprising a delivery system according to claim 17 and the working chamber.

19. The system of claim 18, wherein the working chamber comprises a working surface configured to receive said plurality of layers and be lowered step by step; and an energy head for fusing said plurality of layers.

20. The system of claim 19, wherein said energy head is a laser head configured to apply a focused laser beam to a given area of each of layer of said plurality of layers corresponding to a selected cross-sectional area of a model of the molded 3D object, in accordance with the CAD cross-sectional data of the selected cross-sectional area of the model in such a way that each layer is fixed to the layer below.

21. The system of claim 18, wherein the 3D printing system is a compressing system.

22. The system of claim 17, wherein each of said plurality of rotatable drums further comprises:

a cleaning unit configured to clean the rounded photosensitive surface; and an energy scanning unit, wherein the energy scanning unit comprises an energy source configured to selectively emit a light beam towards the respective photosensitive outer surface for discharging the photosensitive outer surface in accordance with a predefined image structure of at least one 3D object; and wherein the movable delivery plate is configured to successively and electrically attract said plurality of layers from said plurality of rotatable drums forming at said plate surface a layer of powder and transfer said layer of powder to the working chamber by electrically rejecting the layer of powder into the working chamber.

* * * * *